(12) United States Patent
Murata

(10) Patent No.: US 8,577,838 B2
(45) Date of Patent: Nov. 5, 2013

(54) COMPUTER-READABLE RECORDING MEDIUM STORING DATA PROCESSING PROGRAM, SERVER APPARATUS, AND DATA PROCESSING METHOD

(75) Inventor: Miho Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 432 days.

(21) Appl. No.: 12/547,805

(22) Filed: Aug. 26, 2009

(65) Prior Publication Data

US 2010/0153337 A1    Jun. 17, 2010

(30) Foreign Application Priority Data

Dec. 16, 2008    (JP) ................................. 2008-319530

(51) Int. Cl.
*G06F 17/30*    (2006.01)
(52) U.S. Cl.
USPC .......................................................... 707/610
(58) Field of Classification Search
USPC ............................................... 707/609, 610
See application file for complete search history.

(56) References Cited

U.S. PATENT DOCUMENTS

| | | | | |
|---|---|---|---|---|
| 6,178,441 | B1 * | 1/2001 | Elnozahy | 709/203 |
| 2006/0047813 | A1 * | 3/2006 | Aggarwal et al. | 709/226 |
| 2008/0086658 | A1 * | 4/2008 | Takahasi | 714/6 |

FOREIGN PATENT DOCUMENTS

JP    02-231676    9/1990

* cited by examiner

*Primary Examiner* — Christyann Pulliam
*Assistant Examiner* — Fariborz Khoshnoodi
(74) *Attorney, Agent, or Firm* — Staas & Halsey LLP

(57) ABSTRACT

A computer-readable recording medium storing a data processing program that causes a computer of a group of mutually communicable computers to execute, an acquisition procedure configured, when a processing request for an arbitrary data is inputted, to acquire the number of replicas set in the arbitrary data, a selection procedure configured to select computers, which serve as arrangement destinations of the arbitrary data and are as many as the number of replicas, from the computers of the computer group by using a predetermined algorithm, a transmission procedure of the number of replicas, configured to transmit the number of replicas of the arbitrary data, which number is acquired by the acquisition procedure, to all the computers of the computer group, and a processing request transmission procedure configured to transmit the processing request to each the computers that are selected by the selection procedure and as many as the number of replicas.

19 Claims, 15 Drawing Sheets

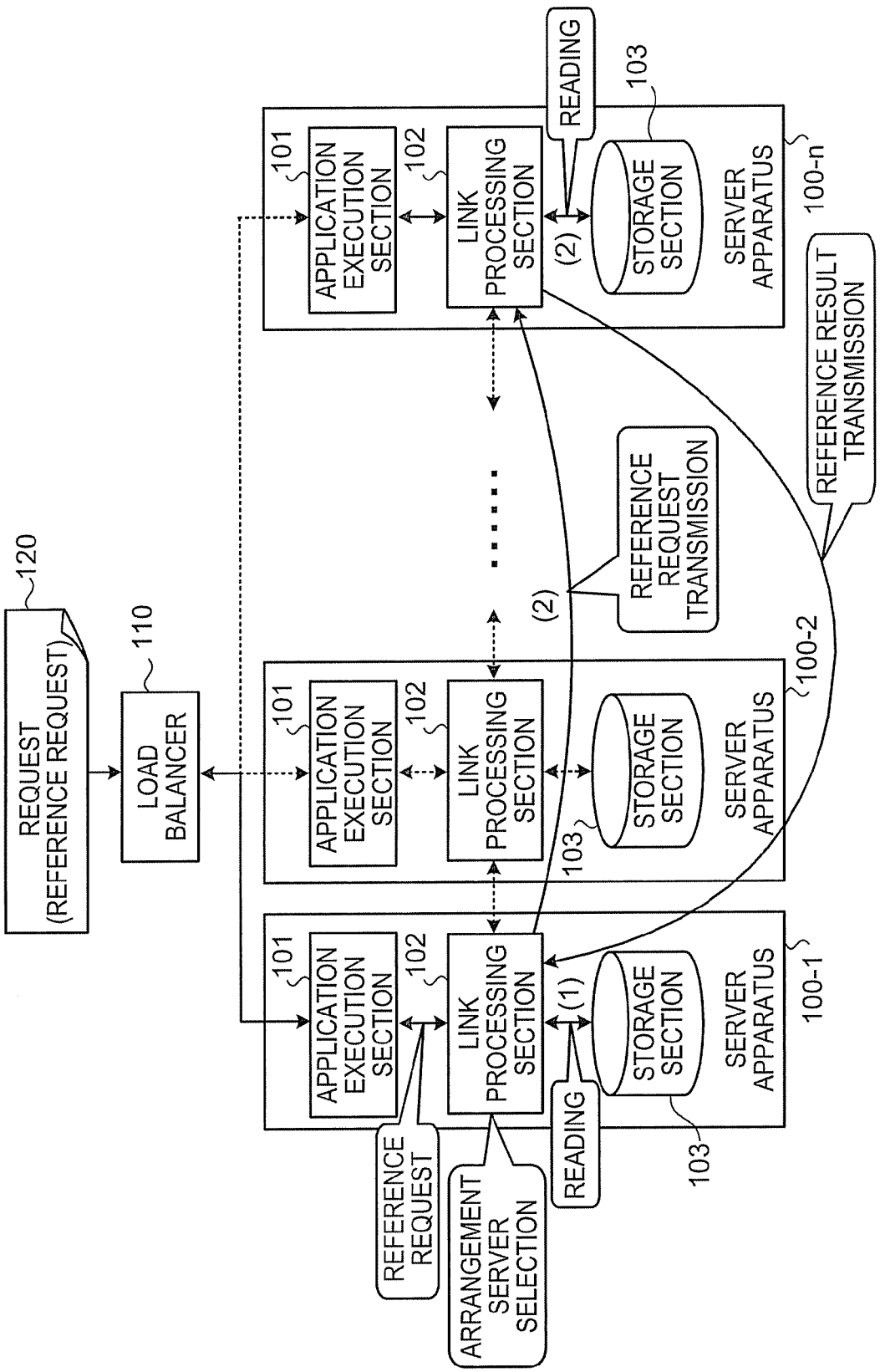

US 8,577,838 B2

COMPUTER-READABLE RECORDING MEDIUM STORING DATA PROCESSING PROGRAM, SERVER APPARATUS, AND DATA PROCESSING METHOD

CROSS-REFERENCE TO RELATED APPLICATION

This application is based upon and claims the benefit of priority of the prior Japanese Patent Application No.2008-319530, filed on Dec. 16, 2008, the entire contents of which are incorporated herein by reference.

BACKGROUND

1. Field

Various embodiments relate to a computer-readable medium storing a data processing program in each computer that constitutes a group of computers capable of communicating with each other, and relates to a server apparatus and a data processing method.

2. Description of the Related Art

In recent years, in a database system that is accessible via a network system, according to an increase in amount of data to be arranged, and an increase in access to the data, there has been an increase in the configuration in which the data are managed by being distributed in a plurality of apparatuses, such as servers and other storages (hereinafter collectively referred to as "server apparatus"). In the case in which data are distributed and arranged in this way, the redundancy is provided in many cases for load distribution and availability improvement in such a manner that replicas (duplicates) of one data are generated so as to be respectively arranged in a plurality of servers.

The total number of replicas, including the source data and the data generated at this time, is referred to as the number of replicas. Usually, the number of replicas is determined according to an access pattern to the data, and the like. For example, in the case where all data are only referred to, all the data are copied in all the server apparatuses in which the data are to be arranged. That is, the number of replicas is equal to the number of the server apparatuses. There are the following advantages in such distribution of data.

Data are arranged in all the server apparatuses, and hence the processing load due to reference requests from clients can be easily distributed by preparing a load balancer that is simply configured so as to distribute each of the reference requests to one of the server apparatuses.

Even when reference requests to the same data are issued from a plurality of clients, the reference requests can be distributed in correspondence with the number of servers.

Availability is high because data are not lost unless all the server apparatuses are down.

On the other hand, in the case where data are not only referred to but also updated, and where the data are copied in all the server apparatuses as described above, the update of data needs to be reflected in all the server apparatuses each time the update of data is performed. As a result, the copy processing is frequently generated in each of the server apparatuses, so that the processing efficiency is lowered. Further, even in the case in which the data are updated, when the number of replicas is set to 1 (no copy state) in order to maximize the processing efficiency of each of the server apparatuses, and when the reference requests are concentrated on the same data, there may be a case where the load distribution cannot be performed and, thereby, the response time to the reference request is increased. Further, other than the server apparatus with the data arranged therein, a standby server apparatus with the same data arranged therein is not prepared, and hence there is a possibility that when the server apparatus is down, the data is lost. As a result, the availability is also significantly reduced.

Therefore, in many conventional cases, the number of replicas is set to a value that is two or more, and which is less than the total number of the server apparatuses. In practice, the number of replicas is determined in consideration of satisfying the access pattern (reference/update ratio and frequency) of data and the availability required by the manager and user of the database. Thereby, data access in both reference and update can be efficiently performed. (Japanese Patent Application Laid-Open Publication No. 2-231676).

SUMMARY

A computer-readable recording medium storing a data processing program that causes a computer of a group of mutually communicable computers to execute, an acquisition procedure configured, when a processing request for an arbitrary data is inputted, to acquire a number of replicas set in the arbitrary data, a selection procedure configured to select computers, which serve as arrangement destinations of the arbitrary data and are as many as the number of replicas, from the computers of the computer group by using a predetermined algorithm, a transmission procedure of the number of replicas, configured to transmit the number of replicas of the arbitrary data, which number is acquired by the acquisition procedure, to all the computers of the computer group and a processing request transmission procedure configured to transmit the processing request to each of the computers that are selected by the selection procedure and as many as the number of replicas.

A server apparatus that is a computer and constitutes a server apparatus group capable of communicating with each other, the server apparatus including an acquisition unit configured, when a processing request for an arbitrary data is inputted, to acquire a number of replicas set in the arbitrary data, a selection unit configured to select server apparatuses, which serve as arrangement destinations of the arbitrary data and are as many as the number of replicas, from the server apparatuses of the server apparatus group by using a predetermined algorithm, a transmission unit of the number of replicas, configured to transmit the number of replicas of the arbitrary data, the number being acquired by the acquisition unit, to all the server apparatuses of the server apparatus group, a processing request transmission unit configured to transmit the processing request to each of the server apparatuses that are selected by the selection unit and as many as the number of replicas, an execution unit configured, when the processing request transmitted from the server apparatus itself or another server apparatus is received, to execute processing corresponding to the processing request, and a determination unit configured to determine at each arbitrary time the number of replicas of the arbitrary data by referring to the processing request for the arbitrary data, which processing request is executed by the execution unit. When the number of replicas different from the currently set number of replicas is determined by the determination unit, the transmission unit of the number of replicas transmits the determined number of replicas to all the server apparatuses of the server apparatus group. When the determined number of replicas is transmitted by the transmission unit of the number of replicas, the selection unit newly selects the server apparatuses, in which the arbitrary data is to be arranged and which are as many as the determined number of replicas, from the server apparatuses of the server apparatus group according to a predetermined algorithm. When the server apparatus itself is selected by the selection unit as the server apparatus with the arbitrary data to be newly arranged therein, the execution unit performs the writing of the arbitrary data. When the server apparatus itself is no longer selected by the selection unit as the server apparatus with the arbitrary data to be newly arranged therein, the execution unit erases the data.

The object and advantages will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is an illustration showing data reference processing in the server apparatus;

DESCRIPTION OF EMBODIMENTS

Figure 1:
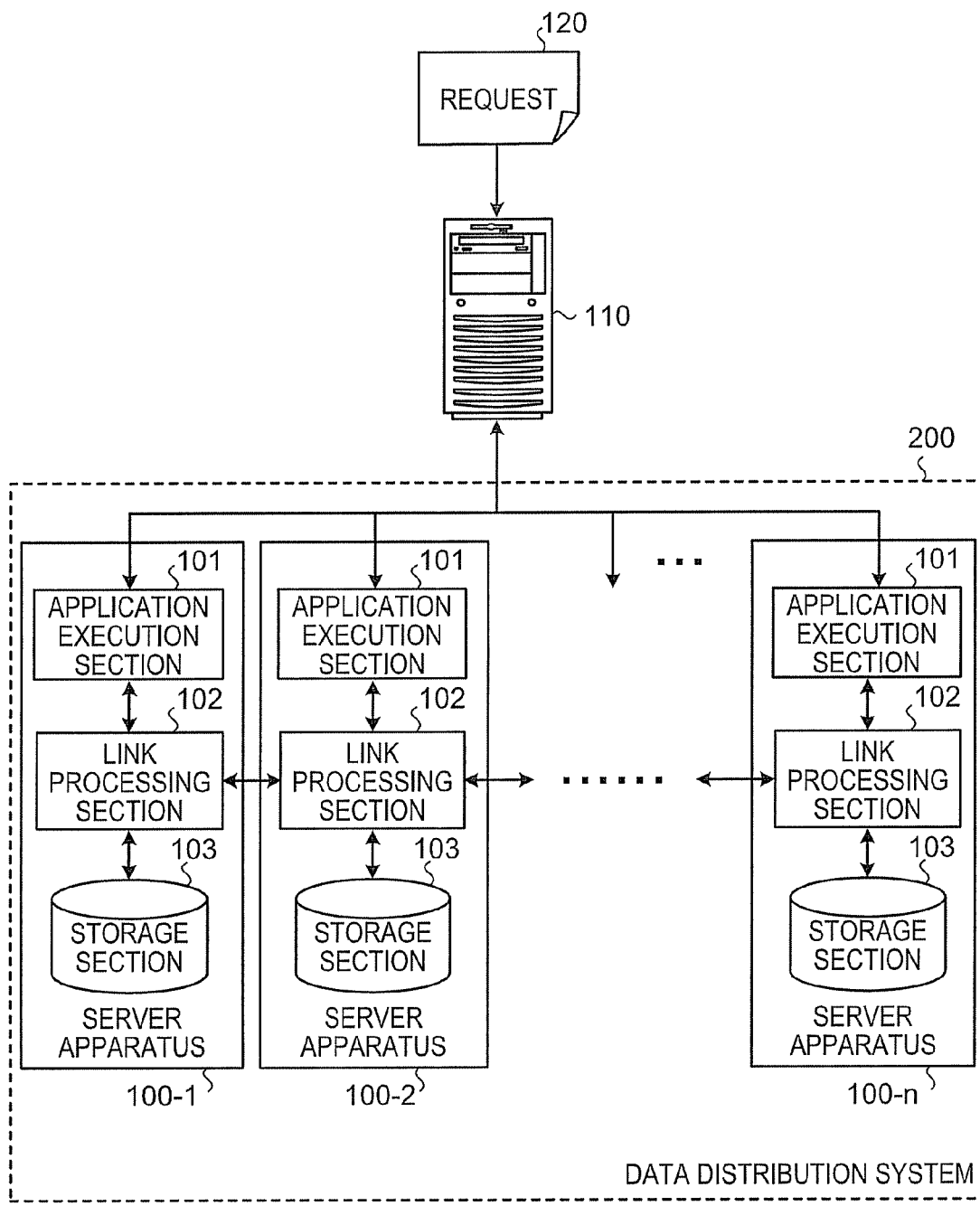
FIG. 1 is an illustration showing a system configuration of server apparatuses according to an embodiment.

As described above, in the case in which the access pattern to each of data arranged in the server apparatuses used as the data distribution type database system is significantly different for each of the data, it is difficult to determine the optimum number of replicas common to all the data. For example, in the case where the number of replicas (common to all the data) is set higher, the reference efficiency to the data with a high reference frequency is increased. However, the data with a high update frequency needs to be updated in correspondence with the number of replicas, so that the processing efficiency in the case of update is lowered.

As a measure to cope with such case, there is also proposed a technique in which the data are classified into data with a high reference frequency and data with a high update frequency, and in which the classified data, each having the number of replicas set thereto, are arranged in each of the server apparatuses. However, in the case where the data cannot be classified by the access pattern difference, such as the case that a method for classifying the data is applied by the owner of the data, only an average value can be set as the number of replicas.

Further, even if the data can be divided on the basis of access patterns at a certain point of time so that the different number of replicas can be set in correspondence with each of the access patterns, when the access patterns are frequently changed, it is difficult to always apply the optimum number of replicas. For example, in the case of a service, such as a blog, in which update processing of the database is mainly performed by general users other than the manager of the server apparatus, the update frequency of a blog article of a user is changed by reason of the user, and the reference frequency to a page of a certain user is rapidly increased by a news report, the occurrence of an event, and the like. Therefore, there is an issue that when the number of replicas remains fixed, the data access efficiency is lowered so as to make it difficult for a referring person to conveniently refer to the data.

Thus, there is also proposed a technique in which in the data distribution type database system, the reference frequency of data is monitored, and in which, as a result of comparison between the reference frequency and a preset reference value (for example, when the reference frequency exceeds the reference value, or when the reference frequency is expected to exceed the reference value), a part or all of the data is copied and transmitted to another site. According to this technique, the reference efficiency can be increased by copying the replica to the site with a high reference frequency. Further, the data are dynamically copied, and hence it is possible to efficiently cope with a change in the tendency of database processing.

However, in the above described technique, only the copying of data is described. Thus, when this technique continues to be used in an environment in which the change in data access is large, all the data are copied to all the sites after a certain time period unless the data copy destination is restricted. Therefore, there is a issue that when the reference frequency of a certain data is reduced and when the update frequency of the data is increased, the effect of the reference load distribution is reduced, and the update efficiency is on the contrary lowered by an extent corresponding to the increase in the number of copies.

In order to solve the issues described above, an object in one aspect is to provide a storage medium that stores a data processing program capable of dynamically determining the number of replicas of each data, and making data processing efficiently performed in each of server apparatuses, and to provide the server apparatus and the data processing method.

In the following, embodiments of the data processing program, the server apparatus, and the data processing method will be described in detail with reference to the accompanying drawings. In the data processing program, the server apparatus, and the data processing method, there is set, for each data, the number of replicas representing the number of server apparatuses in which the data is replicated, and on the basis of the number of replicas, there are selected the server apparatuses in which the replicated data is to be arranged. Then, each time the number of replicas is dynamically changed, the server apparatuses with the data to be arranged therein are selected again by each of the server apparatuses. When the number of replicas is increased, the corresponding data is newly arranged in the server apparatus that is newly added as the data arrangement destination. On the other hand, when the number of replicas is reduced, the corresponding data is erased in the server apparatus that is excluded from the data arrangement destination.

That is, the server apparatuses with the data arranged therein can be dynamically increased or decreased according to the change in the number of replicas. Therefore, it is possible to solve the conventionally experienced issues that the response time is increased due to the concentration of reference requests from clients, and that since in spite of the high update frequency, the number of the server apparatuses with the same data arranged therein is large, each of the server apparatuses is pressed to perform the update processing and, thereby, the processing efficiency is lowered. In the following, there will be specifically described the best mode for realizing the above described data processing.

(Outline of Data Processing)

First, there will be described an outline of data processing according to the present embodiment. FIG. 1 is an illustration showing a system configuration of server apparatuses according to the present embodiment. As shown in FIG. 1, in the present embodiment, a data distribution system 200 is realized by distributing and arranging data in a group of server apparatuses 100 that have the same configuration. The data distributed in the data distribution system 200 includes weblog articles, a common database, and the like, and is not particularly limited. Therefore, as long as the system is configured to handle data presumed to be subjected to reference processing and update processing from a plurality of users, the system can be adapted to various applications.

Further, a load balancer 110 that receives a request 120 representing a processing request from a user is connected to the data distribution system 200. The load balancer 110 assigns the request 120 received from the outside to any of the server apparatuses 100-1 to 100-*n*, which are currently prepared in the data distribution system 200.

When the request 120 is assigned to the server apparatus 100 from the load balancer 110, the server apparatus 100 performs the data processing requested by the request 120 by making an application execution section 101 execute an application (application corresponding to the contents of the request 120). Specifically, the data processing in the server apparatus 100 is configured, as will be described below, by two kinds of processing that correspond to object data update processing and object data reference processing.

<Data Update Processing>

The data update processing is processing in which the contents of the object data designated by the request 120 are changed, and is classified into three kinds of processing that correspond to new write processing, existing data update processing, and existing data erase processing.

<Data Reference Processing>

The data reference processing is processing in which the contents of the object data designated by the request 120 are not changed, and corresponds to existing data read processing.

Note that the request 120 described in the present embodiment is constituted of the information for identifying what kind of the data processing described above is requested, and the information about object data. For example, the configuration of the request 120 at the time of data update and the configuration of the request 120 at the time of data reference are described as follows.

Request at the Time of Update
Request example 1: new write
Kind of access: update (creation of new file)
Data information: new data (name of file to be newly created and contents to be written)
Request example 2: update of existing data
Kind of access: update (overwriting of file)
Data information: data to be updated (name of file to be overwritten and contents to be overwritten)
Request example 3: erase of existing data
Kind of access: update (erase of file)
Data information: data to be erased (name of file to be erased)
Request at the Time of Reference
Request example 4: read of existing data
Kind of access: reference (read of file contents)
Data information: data to be read (name of file to be read)

Further, in the case of the present embodiment, each of the server apparatuses 100 configuring the data distribution system 200 can realize the following functions by including a link processing section 102.

1) The server apparatus 100 that has received the request 120 of (reference and update) access to object data from the outside, such as a client, transmits the received request 120 to the server apparatus 100 in which the data to be processed is arranged. At this time, when the data to be processed is arranged in the server apparatus 100 having received the request, the server apparatus 100 transmits the request to itself. Further, when the object data is arranged in another server apparatus 100, the server apparatus 100 transmits the request to the server apparatus 100. Note that when the request 120 is the update processing request, the request includes therein contents of data to be newly written or contents of update data.

2) The server apparatus 100, in which respective data to be subjected to data processing are arranged, monitors data access patterns (reference/update ratio and frequency), and periodically determines the number of replicas for each of the data.

3) When the number of replicas is changed, the server apparatus 100, in which any of the data is arranged, transmits the information on the change to the other server apparatuses.

4) When receiving the information on the change of the number of replicas of a certain data, the server apparatus 100 with any of the data arranged therein specifies the arrangement destination of the certain data on the basis of the changed number of replicas. When the number of replicas is increased, the server apparatus 100 determines, by using a predetermined rule, a transmission source server that transmits the replicas corresponding to the increase in number of replicas. When the server apparatus 100 itself is the transmission source server, the server apparatus 100 copies the replicas of the data in new arrangement destinations. When the number of replicas is reduced, and when the server apparatus 100 itself is excluded from the arrangement destination, the server apparatus 100 erases the data.

The function of the server apparatus 100 according to the present embodiment is particularly featured by the function 1) described above. As shown in FIG. 1, the request 120 of processing for the data arranged in the data distribution system 200 (data desired to be newly arranged in the case of new write request) is transmitted to any of the server apparatuses 100 configuring the data distribution system 200 via the load balancer 110. At this time, on the basis of the number of replicas set in the object data of the request 120, the server apparatus 100 with the request 120 assigned thereto selects the server apparatuses 100 with the object data arranged therein.

As shown in FIG. 1, when the data distribution system 200 is constituted of the n server apparatuses 100, the object data with the number of replicas set to 3 is arranged in the three server apparatuses 100 (for example, server apparatuses 100-1, 100-2 and 100-$n$). Therefore, when one of the three server apparatuses 100-1, 100-2 and 100-$n$ receives, as the request 120, the update request of the object data, the update request is transmitted to all the three server apparatuses 100-1, 100-2 and 100-$n$ in each of which the object data is arranged.

On the other hand, when one of server apparatuses 100 receives, as the request 120, a reference request for the object data, the reference request is transmitted to one of the three server apparatuses 100-1, 100-2 and 100-$n$. The server apparatus 100 having received the reference request refers to the object data arranged therein, and returns the reference result to the server apparatus 100 having received the request 120. In this way, in the data distribution system 200, the bidirectional communication for processing the request is performed between the server apparatuses 100. The bidirectional communication is directly performed by the link processing section 102 (as will be described below) included in the server apparatus 100.

As described above, in the present embodiment, each of the object data is distributed and arranged in any of the plurality of server apparatuses 100 prepared on the basis of the number of replicas. At this time, the number of distributed server apparatuses is equal to the number of replicas. Further, the number of replicas is periodically calculated while the state of data access from clients is monitored. Then, the data arrangement destinations are again determined on the basis of the newly calculated number of replicas. Therefore, even in the environment in which the access pattern is frequently changed, the optimum number of replicas is always applied in correspondence with the change. Thereby, the performance as the data distribution system 200, and the convenience of the user who transmits the request 120 to the object data and of the manager of the data distribution system 200 can be maintained to a fixed level.

In the conventional technique, in the case where a manual change of the number of replicas is desired to be avoided after the start of operation of the system, it is necessary that the access pattern to each of the data is analyzed in detail beforehand, so as to determine the number of replicas. In the present embodiment, each of the server apparatuses 100 is able to dynamically change the contents of data arrangement according to the number of replicas, and hence the number of replicas can be dynamically changed even during operation of each of the server apparatuses 100. Therefore, even when the number of replicas is determined without previous detailed analysis, the number of replicas is changed while actual data are analyzed. Thereby, it is possible to eventually apply the optimum number of replicas.

Further, in the case in which the number of replicas is determined by the previous analysis, as in the conventional technique, a predicted value may be applied because the data during the actual operation cannot be used. In many cases, the predicted value is significantly different from the actual state value. This may result in a case where, even when the detailed analysis is performed, the analysis result cannot serve to maintain the efficiency of the server apparatus 100, so as to become meaningless. In the server apparatus 100 according to the present embodiment, even when the default number of replicas is not suitable, it is possible to eventually apply the optimum number of replicas.

(System Configuration)

Next, there will be described a system configuration of a server apparatus that realizes the data processing as described above. As shown in FIG. 1, the access to the data distribution system 200 is performed via the load balancer 110. The load balancer 110 collectively receives the request 120 inputted by the user using a client terminal, and transmits the received data and processing request to any of the server apparatuses 100 configuring the data distribution system 200.

The load balancer 110 is not particularly limited in the operation to assign the data and the processing request. For example, the load balancer 110 may successively assign the received data and processing requests in the order of the apparatus number of the server apparatus 100, or may assign at random the received data and processing requests other than the server apparatus 100 in a busy state while monitoring the operation state of the respective server apparatuses 100.

Next, there will be described a configuration of each of the server apparatuses configuring the data distribution system 200. Each of the server apparatuses 100 is configured by including the application execution section 101, the link processing section 102, and a storage section 103. Further, an application, which is executed by the application execution section 101 at the time when an access is made to each data, is set so as to operate on all the server apparatuses 100 in which the corresponding data is arranged. The storage section 103 is a recording area in which data are actually arranged, and is realized by various memories and a disk. A known technique is used for the processing to actually write the data in the storage section 103, and hence the description thereof is omitted here.

The server apparatus 100 according to the present embodiment is featured by the link processing section 102. When the request 120 is newly assigned by the load balancer 110, the application execution section 101 converts the inputted request 120 to the processing (request) to actually access the data, and transmits the request to the link processing section 102 of its own server apparatus 100. Thus, when receiving the request 120, the link processing section 102 selects server apparatuses (hereinafter referred to as "arrangement servers") in which the data is to be arranged, according to the number of replicas set in the object data included in the request 120, and transmits the request 120 to the link processing section 102 of the selected server apparatuses 100.

Further, in the case in which the number of replicas is set for a newly inputted data, or in which the number of replicas for a certain data is updated by the function as will be described below, the link processing section 102 transmits the number of replicas corresponding to the data to each of the server apparatuses 100 together with information (for example, the file name including the data contents) for identifying the data. In this way, the information on the number of replicas set for each of the data is held by the link processing section 102. Thereby, even when the request 120 for any of the data is assigned to the server apparatus 100, the server apparatus 100 can specify the arrangement server of the object data, so as to make suitable processing performed.

(Hardware Configuration of Server Apparatus)

Figure 2:
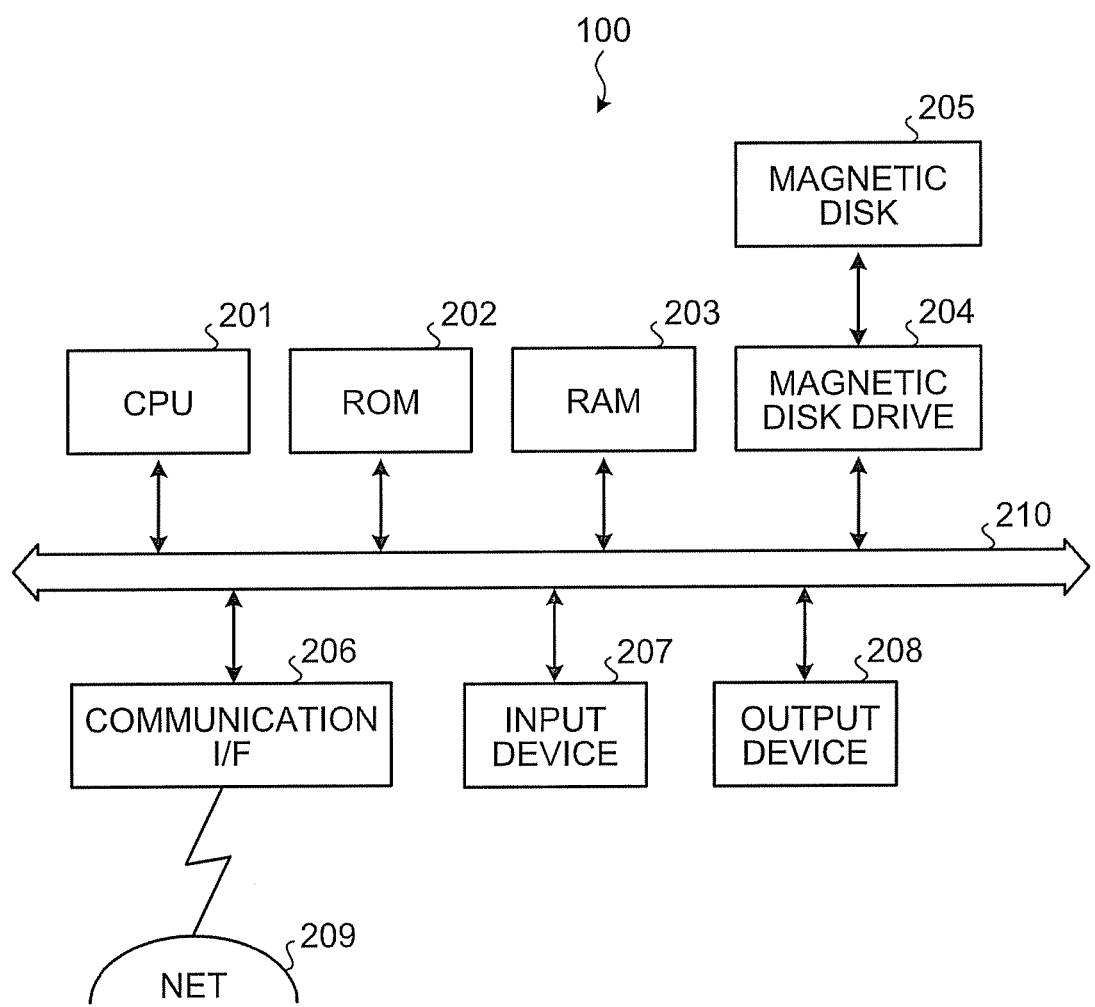
FIG. 2 is a block diagram showing a hardware configuration of the server apparatus according to an embodiment.

Next, there will be described a specific hardware configuration of a server apparatus. FIG. 2 is a block diagram showing a hardware configuration of a server apparatus according to the present embodiment. In FIG. 2, the server apparatus 100 includes a CPU (Central Processing Unit) 201, a ROM (Read-Only Memory) 202, a RAM (Random Access Memory) 203, a magnetic disk drive 204, a magnetic disk 205, a communication I/F (Interface) 206, an input device 207, and an output device 208. Further, the respective component sections are connected to each other by a bus 210.

Here, the CPU 201 performs overall control of the server apparatus 100. The ROM 202 stores various programs, such as a boot program, and a data processing program for realizing the data processing according to the present embodiment. The RAM 203 is used as a work area of the CPU 201. According to the control by the CPU 201, the magnetic disk drive 204 controls the data update and reference performed to the magnetic disk 205. The magnetic disk 205 stores the data written under the control of the magnetic disk drive 204. Note that in the hardware configuration shown in FIG. 2, the magnetic disk 205 is used as a recording medium serving as the storage section 103, but other recording media, such as an optical disk and a flash memory, may also be used.

The communication I/F 206 is connected to a network (NET) 209, such as a LAN (Local Area Network), a WAN (Wide Area Network), and the Internet, through a communication line, and is connected to the other server apparatuses 100 and load balancers 110 via the network 209. The communication I/F 206 serves as an interface between the network 209 and the inside, and performs control of the input and output of data from and to the external apparatus. As a configuration example of the communication I/F 206, it is possible to adopt, for example, a modem, a LAN adapter, and the like.

The input device 207 receives an input to the server apparatus 100 from the outside. As the input device 207, there are specifically listed a keyboard, a mouse, and the like. Note that the server apparatus 100 as exemplified in FIG. 1 executes an application according to the request 120 assigned by the load balancer 110, and hence does not receive the request 120 from the input device 207. The input device 207 is provided for the purpose of the maintenance and management of the server apparatus 100.

In the case in which the keyboard is used as the input device 207, the keyboard includes, for example, keys for input of a character, a number, and various instructions, and the like, and is used to input the data. Further, the input device 207 may be a touch panel type input pad, a ten-key, and the like. In the case where the mouse is used as the input device 207, the mouse is used, for example, for moving a cursor and selecting a movement range of the cursor, or for moving a window and changing the size of the window. Further, a trackball, a joystick, or the like, may also be used as the input device 207, as long as they have similar functions as a pointing device.

The output device 208 outputs data arranged in the server apparatus 100, and an application execution state, and further outputs an access pattern of each of the arranged data, the analysis result of the access pattern, and the like. Specifically, as the output device 208, there are listed a display, a printer, and the like.

In the case in which the display is used as the output device 208, the display displays, for example, not only a cursor, an icon, or a toolbox, but also data of a document, an image, functional information, and the like. As the display, there may also be adopted a CRT, a TFT liquid crystal display, a plasma display, and the like. Further, in the case in which the printer is used as the output device 208, the printer performs the printing of, for example, image data and document data. Further, as the printer, there may also be used a laser printer and an ink-jet printer.

Note that the input device 207 and the output device 208, as described above, are not essential components for the function of the server apparatus 100, and may be suitably changed according to the convenience of the manager.

(Functional Configuration of Link Processing Section)

Next, there will be described in detail the processing performed by the link processing section 102. As described with reference to FIG. 1, the link processing sections 102 of the respective server apparatuses 100 are capable of performing bidirectional communication with each other. When a request 120 for a certain data is assigned, the transmission and reception of the request 120 (the kind of processing, information for identifying data, and contents of the data) are performed by the control of the link processing section 102, as will be described below. Further, when the number of replicas for a certain data is newly determined or changed, the transmission and reception of the information on the new number of replicas (information for identifying the data, the data contents, and the new number of replicas) are performed.

Figure 3:
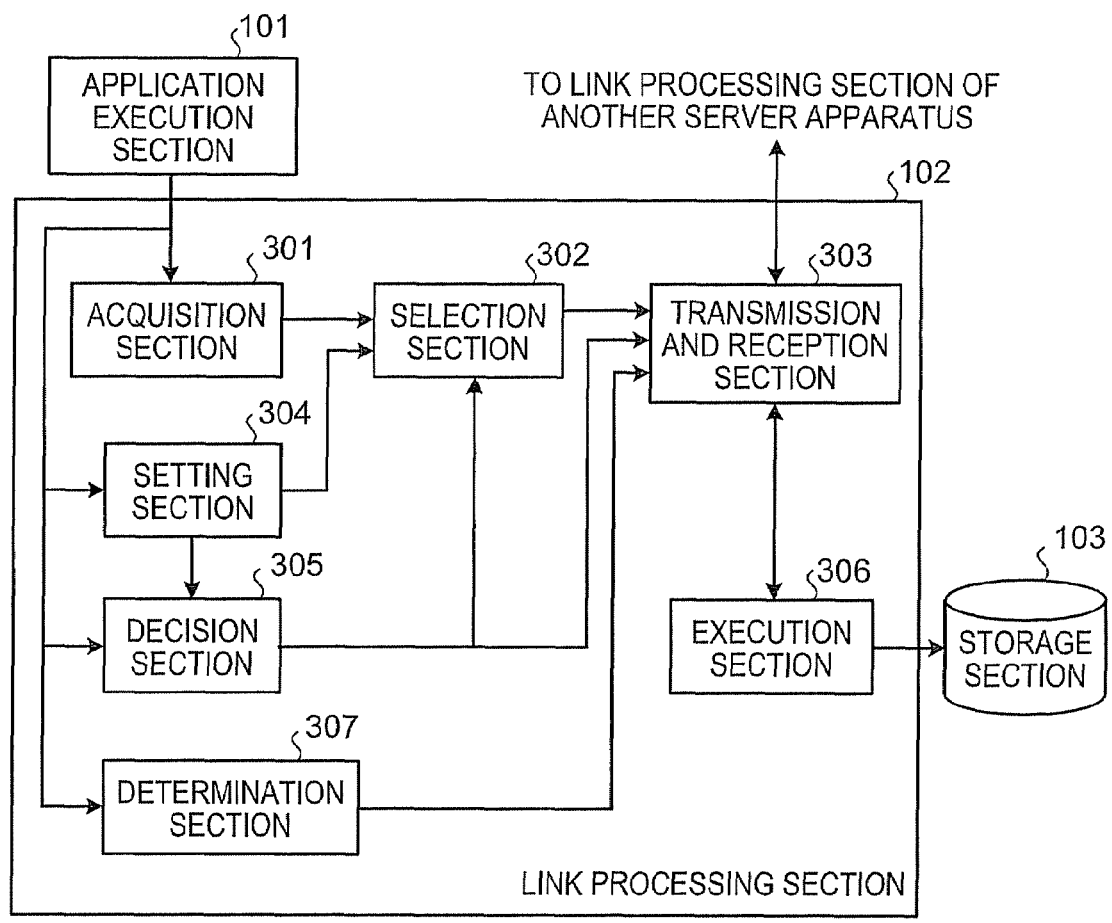
FIG. 3 is a block diagram showing a functional configuration of a link processing section.

Therefore, in the following, there will be described a functional configuration to enable the link processing section 102 of the server apparatus 100 according to the present embodiment to realize the above described control. FIG. 3 is a block diagram showing a functional configuration of the link processing section. As shown in FIG. 3, the link processing section 102 includes an acquisition section 301, a selection section 302, a transmission and reception section 303, a setting section 304, a decision section 305, an execution section 306, and a determination section 307. The functions (of the acquisition section 301 to the determination section 307) serving as a control section can be specifically realized by making the CPU 201 execute programs stored, for example, in storage areas in the ROM 202 and the RAM 203, and the magnetic disk 205, which are shown in FIG. 2, or can be realized via the I/F 206.

When the request 120 is inputted as a processing request for an arbitrary data, the acquisition section 301 acquires the number of replicas set in the data. As described above, in the case in which the data is already arranged in the storage section 103 of any of the server apparatuses 100 configuring the data distribution system 200, the information on the number of replicas of the data is stored in all of the server apparatuses 100. Therefore, the acquisition section 301 acquires the number of replicas set in the object data of the inputted request 120. The number of replicas acquired by the acquisition section 301 and the correspondence information between the number of replicas and the data are respectively stored in a storage area, such as in the storage section 103 (for example, the magnetic disk 305).

From the server apparatuses 100 configuring the data distribution system 200, the selection section 302 selects, by using a predetermined algorithm, the server apparatuses 100 in which the object data of the request 120 is arranged and which are as many as the number of replicas. Note that the algorithm used as a standard of the selection is not particularly limited here. For example, there may be used a method in which a hash value of the inputted data is obtained, and in which the server apparatuses 100 as many as the number of replicas are selected, as the arrangement servers, in order from the server apparatus 100 whose apparatus number coincides with the remainder obtained by dividing the hash value by the number of server apparatuses.

In addition, in the case in which there are N server apparatuses 100, there may also be used a method in which the identification number of the inputted data is converted into an N-digit number, and in which the server apparatuses 100 as many as the number of replicas are selected, as the arrangement servers, in order from the server apparatus 100 whose apparatus number coincides with the converted identification number. The information on the arrangement servers that are selected by the selection section 302 is stored in the storage area of the storage section 103, and the like.

The transmission and reception section 303 performs bidirectional communication with the link processing section 102 of another server apparatus 100. For example, when the number of replicas for an arbitrary data is acquired by the acquisition section 301, the transmission and reception section 303 transmits the acquired number of replicas to all the server apparatuses 100 configuring the data distribution system 200. Further, the transmission and reception section 303 transmits the request 120 to each of the server apparatuses 100 that are selected, by the selection section 302, as the arrangement servers and as many as the number of replicas. Further, the transmission and reception section 303 also serves to receive the number of replicas and the request 120 that are transmitted from the link processing section 102 of another server apparatus 100.

When a request of new write processing is inputted as the request 120 for an arbitrary data, the setting section 304 sets a pre-given value as the number of replicas of the data. In the case of new write processing, the number of replicas is not decided and is not be able to acquired from the storage section 103. Therefore, an initial value set beforehand by the manager of the data distribution system 200 can be set as the number of replicas. Note that even if the number of replicas unsuitable for the data access contents is set at this time, the setting has no adverse effect on the processing efficiency because the number of replicas is dynamically changed by the determination section 307, as will be described below.

Note that also in the case where the number of replicas for an arbitrary data is set by the setting section 304, the selection section 302, as well as the transmission and reception section 303, perform the selection of the arrangement server, and the transmission of the number of replicas and the request 120, similarly to the case where the number of replicas is set by the acquisition section 301.

When the request 120 of the update processing (includes new write processing) is inputted, and when the number of replicas for the arbitrary data is set by the setting section 304, the decision section 305 decides whether or not the number of replicas is equal to the total number of the server apparatuses 100 in the server apparatus 100 group. When it is decided by the decision section 305 that the number of replicas is equal to the total number of the server apparatuses 100 in the server apparatus 100 group, the transmission and reception section 303 transmits the request 120 representing the request of update processing of the arbitrary data to all the server apparatuses 100 in the server apparatus 100 group.

Further, when it is decided by the decision section 305 that the number of replicas is not equal to the total of the server apparatuses 100 in the server apparatus 100 group, the server apparatuses 100, in which the data is to be arranged and which are as many as the number of replicas, are selected from the server apparatuses 100 in the server apparatus 100 group by the selection section 302 using the algorithm described above. Then, the transmission and reception section 303 transmits the request 120 representing the update processing for the data to each of the server apparatuses 100 that are selected by the selection section 302 and as many as the number of replicas.

Note that when a request of reference processing is inputted as the request 120 for a certain data, the transmission and reception section 303 may transmit the request 120 representing the request of reference processing to one of the server apparatuses 100 that are selected by the selection section 302 and as many as the number of replicas.

Further, when the execution section 306 receives the request 120 via the transmission and reception section 303 from its own server apparatus or another server apparatus, the execution section 306 performs processing according to the request 120. Therefore, when receiving the update request, the execution section 306 performs the update processing, while when receiving the reference request, the execution section 306 performs the reference processing. Note that when receiving the update request as the request 120, the execution section 306 is set in a standby state after finishing the update processing. On the other hand, when receiving the reference request as the request 120, the execution section 306 returns the result of the reference processing performed to the object data to the server apparatus 100 as the transmission source of the request 120 via the transmission and reception section 303.

This is because when seen from the server apparatus 100 to which the request 120 is assigned, the processing is performed under the assumption that the execution of the request 120 is performed in the server apparatus itself. Therefore, when the result of the reference processing is not returned to the server apparatus 100 as the transmission source of the processing request, it is continuously decided in the server apparatus 100 with the request 120 assigned thereto that the request for the processing is not performed. Thus, the occurrence of such state can be prevented by returning the result of the reference.

Further, the server apparatus 100 may include a function to autonomously determine the number of replicas in the server apparatus itself. The determination section 307 is capable of determining the number of replicas of each data at each arbitrary time with reference to the request 120 performed to the each data by the execution section 306.

Therefore, even when the number of replicas differs from the currently set number of replicas is determined by the determination section 307, the transmission and reception section 303 transmits the new number of replicas to all of the server apparatuses 100. The selection section 302 of each of the server apparatuses 100 selects the arrangement servers on the basis of the transmitted new number of replicas. The execution section 306 writes the object data in the storage section 103, when its own server apparatus 100 is newly selected as the arrangement server by the selection section 302. On the other hand, the execution section 306 erases the object data from the storage section 103, when its own server apparatus 100 is no longer newly selected by the selection section 302 as the arrangement server of the object data, that is, excluded from the selection of the arrangement server.

There is listed, for example, a method in which there are obtained average values of the processing time of the object data in the cases where the number of replicas of the object data is set to the total number of the server apparatuses 100 of the server apparatus 100 group, and where the number of replicas of the object data is set to 1, and in which the number of replicas is determined by the comparison between the obtained average values. As a result of the comparison, when the former is smaller than the latter, the total number of the server apparatuses 100 of the server apparatus 100 group can be determined as the number of replicas, while when the latter is smaller than the former, the minimum value, which can be set as the number of replicas, can be determined as the number of replicas.

As described above, in the server apparatus 100 according to the present embodiment, even when the request 120 received by the load balancer 110 is assigned to any of the server apparatuses 100 in the data distribution system 200, the arrangement destinations of the object data of the request 120 can be decided according to the number of replicas set in the object data. Therefore, even when the request 120 of any content is received, the data can be efficiently distributed by selecting the arrangement servers according to the number of replicas. In the following, specific operations of the server apparatus 100 having the above described functions will be successively described by separating the operations into the operation at the time of data update processing and the operation at the time of data reference processing.

(Data Update Processing)

Figure 4:
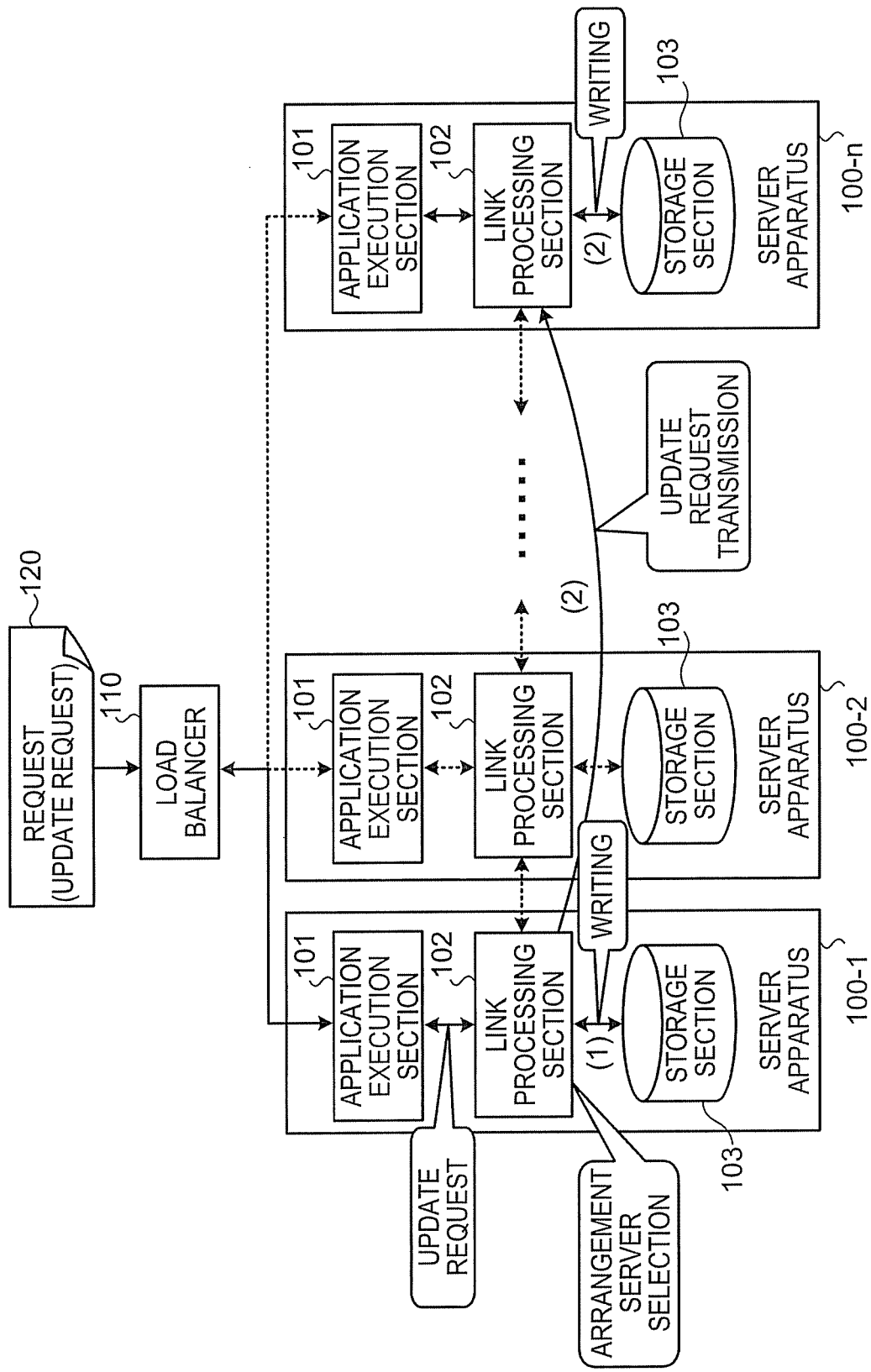
FIG. 4 is an illustration showing data update processing in the server apparatus.

First, there will be described the data update processing in the server apparatus 100. FIG. 4 is an illustration showing the data update processing in the server apparatus. With reference to FIG. 4, there will be described a procedure by which the link processing section 102 of each of the server apparatuses 100 accesses to object data according to the number of replicas set for each of the data.

First, the load balancer 110 assigns the update processing of the object data (writing of new data, writing to arranged data, erasing of arranged data) to one of the server apparatuses 100 (the server apparatus 100-1 in FIG. 4). The link processing section 102 determines the arrangement server of the data according to a predetermined algorithm.

Figure 5:
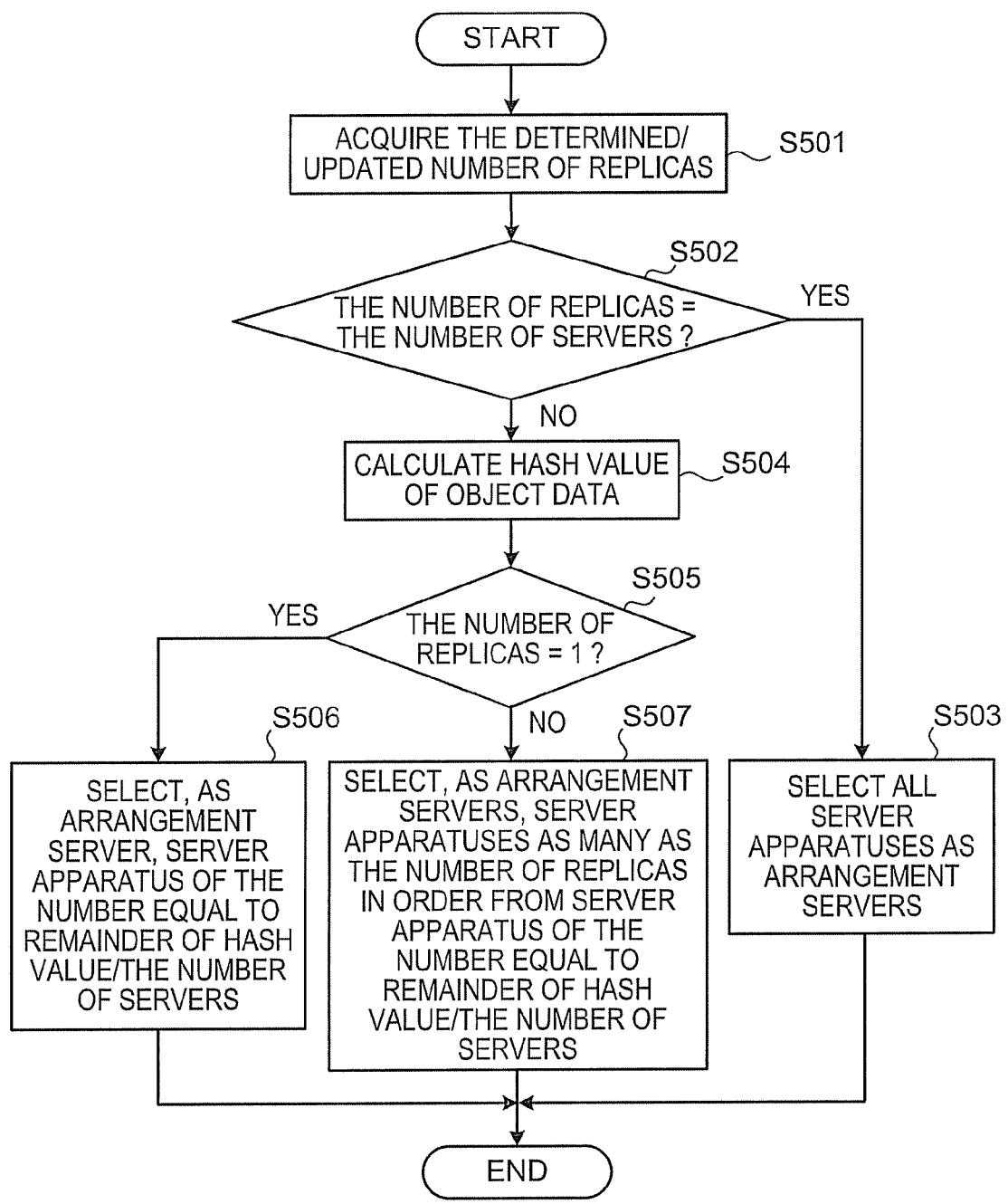
FIG. 5 is a flow chart showing a procedure of an arrangement server selection processing.

Here, there is described the procedure to determine the arrangement server. FIG. 5 is a flow chart showing the procedure of arrangement server selection processing. In the flow chart shown in FIG. 5, the link processing section 102 first acquires the number of replicas newly determined or updated (operation S501). Then, the link processing section 102 decides whether or not the acquired number of replicas is equal to the (total) number of the server apparatuses 100 (operation S502). Here, the number of the server apparatuses 100 that is compared with the number of replicas means the total number of the server apparatuses 100 to which the request 120 is set to be assigned by the load balancer 110. Therefore, the number of the server apparatuses 100 is set to n in the example shown in FIG. 1 or FIG. 4.

When deciding in operation S502 that the number of replicas is equal to the number of servers (operation S502: Yes), the link processing section 102 is required to transmit the update request to all the server apparatuses 100. Thus, the link processing section 102 determines all the server apparatuses 100 as the arrangement server (operation S503), and ends a series of arrangement server selection processing.

On the other hand, when deciding in operation S502 that the number of replicas is not equal to the number of server apparatuses 100 (operation S502: No), the link processing section 102 shifts to processing to determine the arrangement servers as many as the number of replicas from all the server apparatuses 100. First, the link processing section 102 calculates a hash value of the object data (operation S504). Then, the link processing section 102 decides whether or not the number of replicas is 1 (operation S505).

When deciding in operation S505 that the number of replicas is equal to 1 (operation S505: Yes), the link processing section 102 obtains a remainder at the time of dividing the calculated hash value by the (total) number of the servers, and selects the server apparatus 100 whose apparatus number coincides with the remainder, as an arrangement server (operation S506), so as to end a series of processing. On the other hand, when deciding in operation S505 that the number of replicas is not equal to 1 (operation S505: No), the link processing section 102 obtains a remainder at the time of dividing the calculated hash value by the (total) number of the servers similarly to operation S506, and selects, as the arrangement servers, the server apparatuses 100 as many as the number of replicas in order from the server apparatus 100 whose apparatus number coincides with the remainder (operation S507), so as to end a series of processing.

Specifically, in the processing in operation S506 and operation S507, the link processing section 102 obtains, for example, a remainder (odd) by dividing the hash value by the number of servers. Then, when the number of replicas=1, the link processing section 102 selects the server apparatus 100 whose apparatus number is set to the odd, as the arrangement server as in operation S506. When the number of replicas=m ($1<m<n$), the link processing section 102 selects the m server apparatuses 100 whose apparatus numbers are respectively set to odd, odd+1, . . . , odd+m−1, as arrangement servers as in operation S507.

Next, returning to FIG. 4, there will be described update processing patterns (1) and (2). When determining the arrangement server, the link processing section 102 is then required to transmit the received update request to the arrangement server. At this time, the link processing section 102 is required to perform the update processing of pattern (1) in which the write processing is performed according to the update request in the case in which its own server apparatus is the arrangement server, and the update processing of pattern (2) in which the write processing is performed to the arrangement server other than its own server apparatus according to the update request.

Figure 6A:
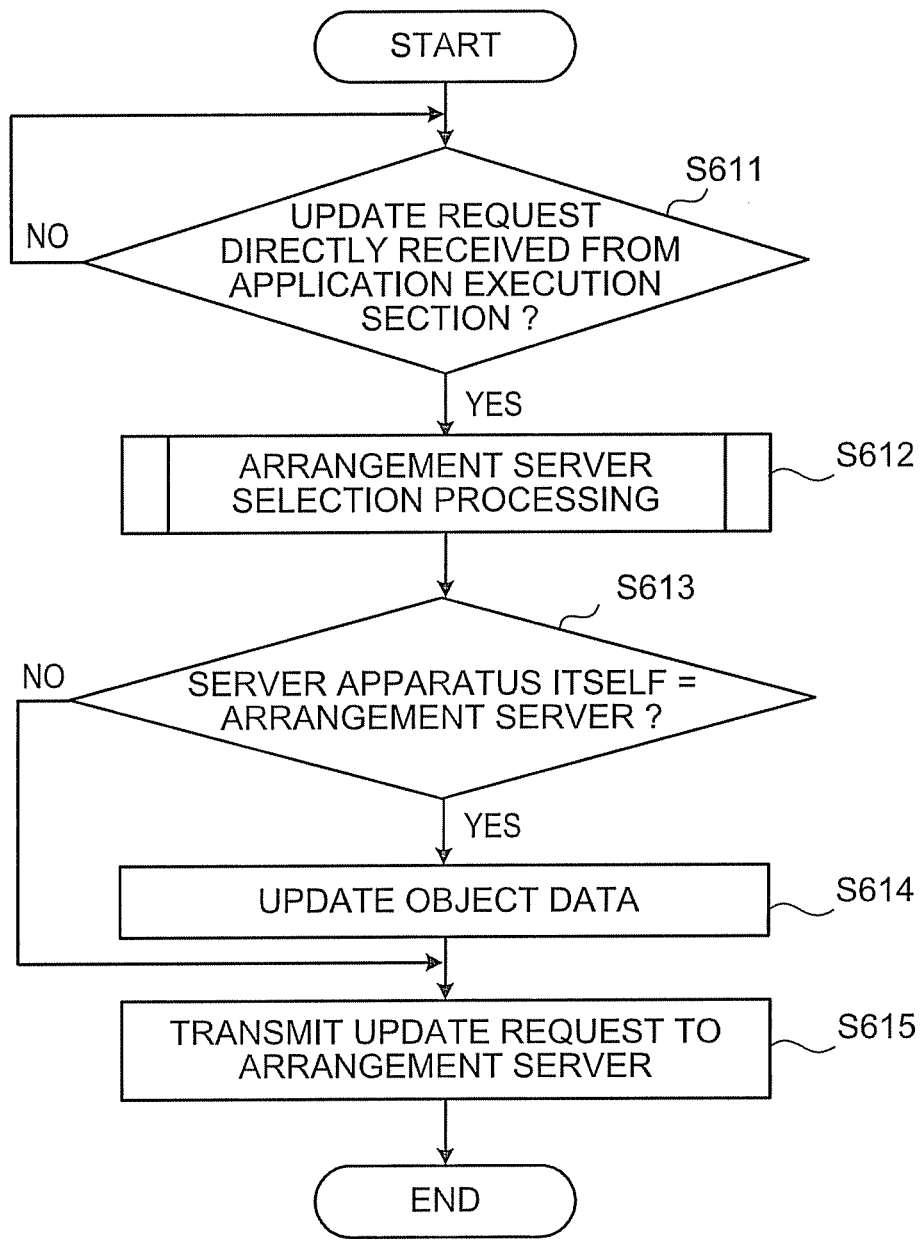
FIG. 6A is a flow chart showing a procedure of data update processing (in the case of the server apparatus which has received an update request from an application execution section of the server apparatus itself)

FIG. 6A is a flow chart showing a procedure of data update processing (in the case of the server apparatus which has received the update request from its own application execution section). In the flow chart shown in FIG. 6A, the link processing section 102 decides whether or not it has received the update request from the application execution section 101 of its own server apparatus (operation S611). Here, the link processing section 102 is set in a standby state until it receives the update request (operation S611: loop of No). When receiving the update request (operation S611: Yes), the link processing section 102 performs the arrangement server selection processing (operation S612).

Next, with reference to the result of the arrangement server selection processing in operation S612, the link processing section 102 decides whether or not its own server apparatus is the arrangement server (operation S613). Here, when deciding that its own server apparatus is the arrangement server (operation S613: Yes), the link processing section 102 updates the object data according to the data update request (operation S614), and transmits the update request to another arrangement server (operation S615), so as to end a series of processing. Note that when deciding that its own server apparatus is not the arrangement server in operation S613 (operation S613: No), the link processing section 102 shifts to operation S615 without performing the update request in operation S614, and transmits the update request to another arrangement server (operation S615), so as to end a series of processing.

Figure 6B:
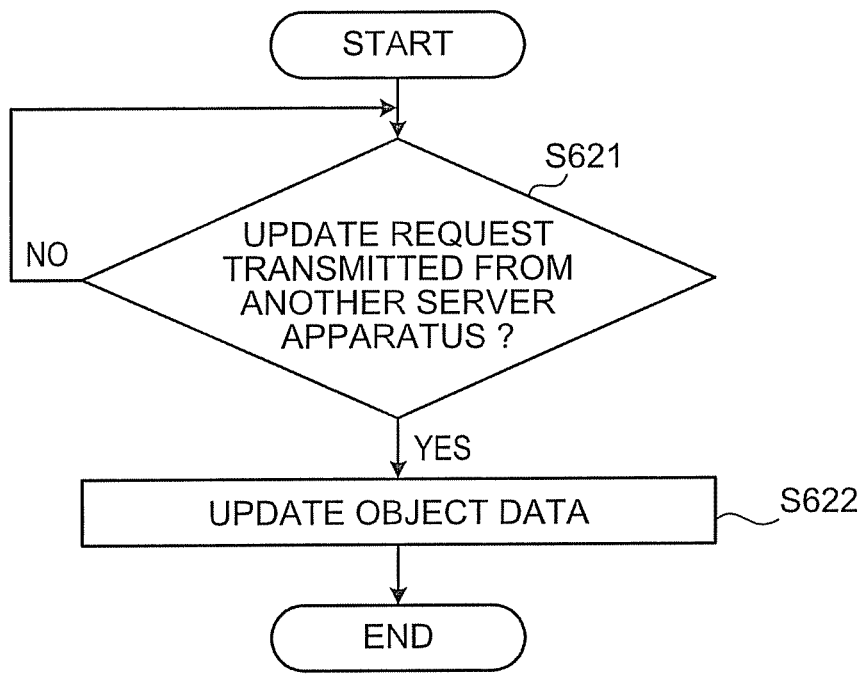
FIG. 6B is a flow chart showing a procedure of data update processing (in the case of the server apparatus which has received an update request from a link processing section of another server apparatus)

Then, when the update request is transmitted, as in operation S615, to another server apparatus 100 determined as the arrangement server, further processing needs to be performed in the transmission destination server apparatus 100 (the server apparatus 100-n in the case of FIG. 4). FIG. 6B is a flow chart showing a procedure of the data update processing (in the case of the server apparatus that has received the update request from the link processing section of another server apparatus). In the flow chart shown in FIG. 6B, the link processing section 102 first decides whether or not the update request is received from another server apparatus 100 (operation S621). Here, the link processing section 102 waits until the update request is received (operation S621: loop of No). When deciding that the update request is received (operation S621: Yes), the link processing section 102 updates the object data according to the update request (operation S622), so as to end a series of processing.

(Data Reference Processing)

Next, there will be described the data reference processing in the server apparatus 100. FIG. 7 is an illustration showing the data reference processing in the server apparatus. Also in FIG. 7, the following description will be given under the assumption that the request 120 (reference request) is assigned to the server apparatus 100-1. The link processing section 102 determines the arrangement server of the data according to a predetermined algorithm similarly to the case of the update processing (see FIG. 5).

When determining the arrangement server, the link processing section 102 transmits the received reference request to the arrangement server. At this time, the link processing section 102 is required to perform the processing of pattern (1) in which the link processing section 102 performs the read processing according to the reference request in the case where its own server apparatus is the arrangement server, and the processing of pattern (2) in which the link processing section 102 transmits the reference request to the arrangement server other than its own server apparatus, and in which, upon receipt of the transmitted request, another server apparatus 100 performs the read processing according to the reference request. Further, in the case of the above described processing of pattern (2), the server apparatus 100-*n* with the reference request transmitted thereto is required to transmit the reference result to the transmission source server apparatus 100-1. Thus, in the following, there will be described the processing in each of pattern (1) and pattern (2).

Figure 8A:
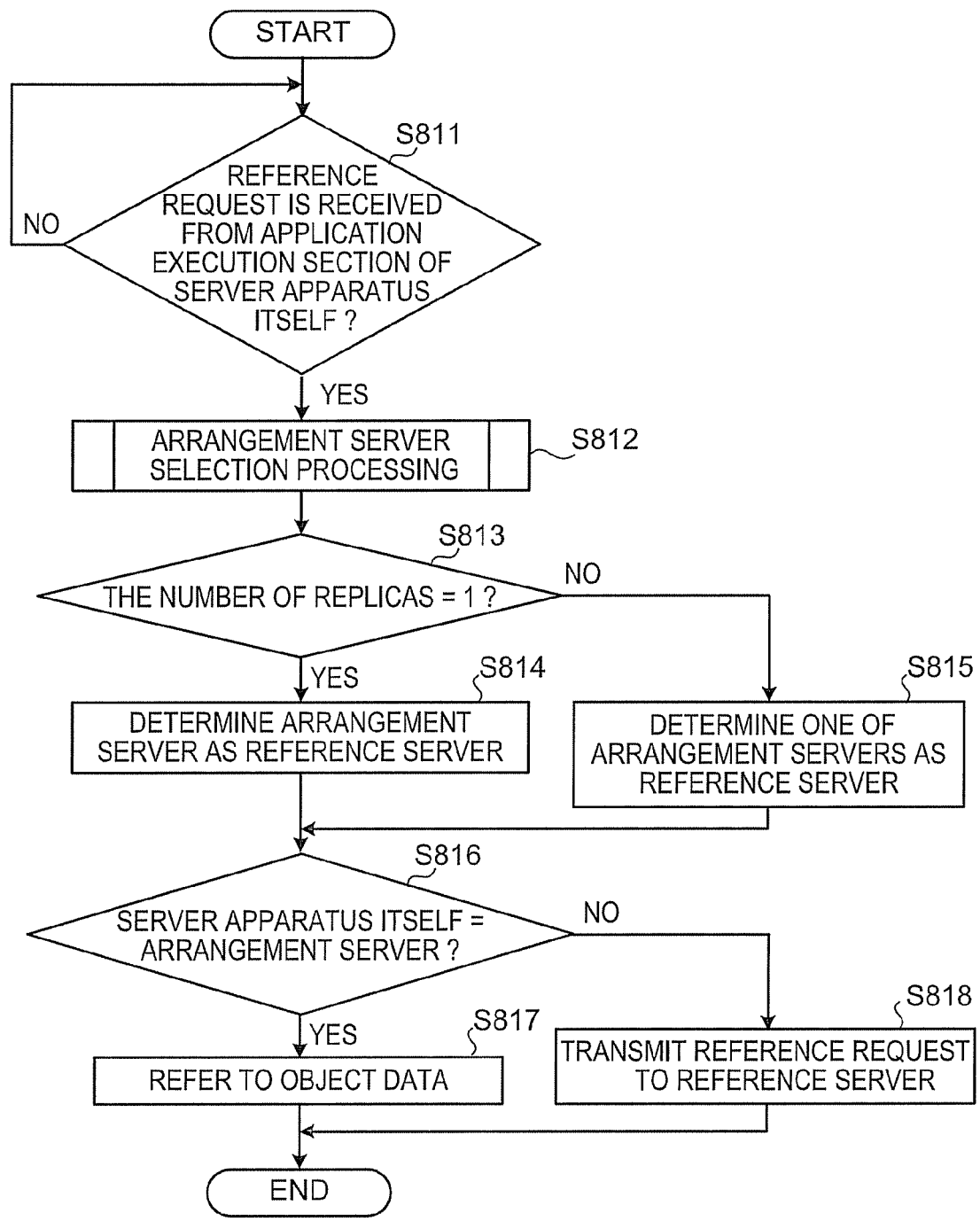
FIG. 8A is a flow chart showing a procedure of data reference processing (in the case of the server apparatus which has received a reference request from the application execution section of the server apparatus itself)

FIG. 8A is a flow chart showing the data reference processing procedure (in the case of the server apparatus having received the reference request from its own application execution section). In the flow chart shown in FIG. 8A, the link processing section 102 first decides whether or not it has received the request 120 (reference request) from the application execution section 101 of its own server apparatus (operation S811). Here, the link processing section 102 is set in a standby state until it receives the data reference request (operation S811: loop of No). When receiving the data reference request (operation S811: Yes), the link processing section 102 performs the arrangement server selection processing (operation S812).

Next, the link processing section 102 decides whether or not the number of replicas of the object data is 1 (operation S813). Then, when the number of replicas is set to 1 (operation S813: Yes), the link processing section 102 determines the server apparatus 100, which is determined as the arrangement server by the arrangement server selection processing in operation S812, as the reference server to which the link processing section 102 performs the data reference processing according to the reference request (operation S814). That is, this means that there is no server apparatus 100 with the object data arranged therein other than the determined arrangement server.

On the other hand, when the number of replicas is set to a value other than 1 (operation S813: No), the link processing section 102 determines one of the server apparatuses 100, which are determined as the arrangement servers by the arrangement server selection process in operation S812, as a reference server to which the link processing section 102 performs the data reference processing according to the reference request (operation S815).

When determining the reference server, the link processing section 102 next decides whether or not its own server apparatus is the arrangement server determined in operation S812 (operation S816). Here, when deciding that its own server apparatus is the arrangement server (operation S816: Yes), the link processing section 102 refers to the object data arranged in the storage section 103 of its own server apparatus (operation S817), so as to end a series of processing. On the other hand, when deciding that its own server apparatus is not the arrangement server (operation S816: No), the link processing section 102 transmits the reference request to the reference server (operation S818), so as to end a series of processing.

Figure 8B:
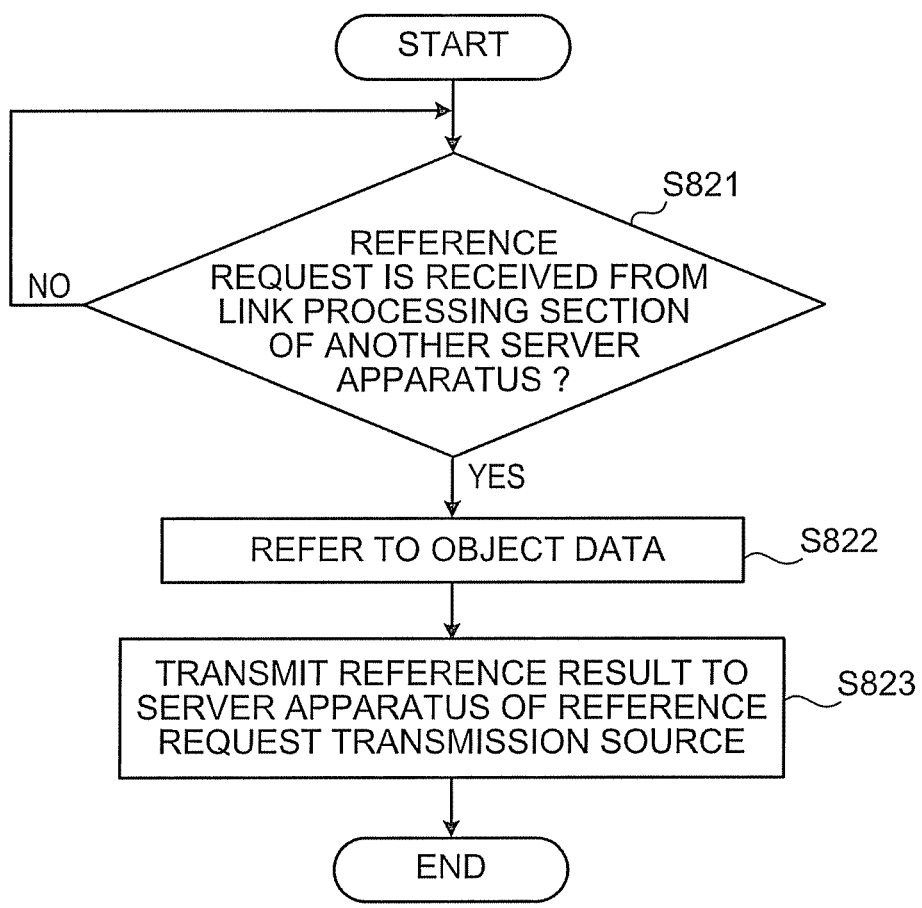
FIG. 8B is a flow chart showing a procedure of data reference processing (in the case of the server apparatus which has received a reference request from the link processing section of another server apparatus)

When the reference request is transmitted, as in operation S818, to another server apparatus 100 determined as the reference server, the transmission destination server apparatus 100 (the server apparatus 100-*n* in the case of FIG. 7) is then required to perform further processing. FIG. 8B is a flow chart showing a procedure of data reference processing (in the case of the server apparatus having received the reference request from the link processing section of another server apparatus).

In the flow chart shown in FIG. 8B, the link processing section 102 of another server apparatus 100 first decides whether or not the reference request is received from the link processing section 102 of another server apparatus 100 (operation S821). Here, the link processing section 102 waits until the reference request is received (operation S821: loop of No). When deciding that the reference request is received (operation S821: Yes), the link processing section 102 refers to the object data according to the reference request (operation S822), and transmits the reference result to the server apparatus 100 as the transmission source of the reference request (operation S823), so as to end a series of processing.

(Data Rearrangement Processing at Change of the Number of Replicas)

Next, there will be described the data rearrangement processing when the number of replicas is changed. The server apparatus 100 according to the present embodiment is required to perform the processing of newly arranging the object data in the storage section 103 according to the change in the number of replicas, or to perform the processing of erasing the object data arranged in the storage section 103. In the following, there will be described the contents of the processing of each of the cases.

Figure 9:
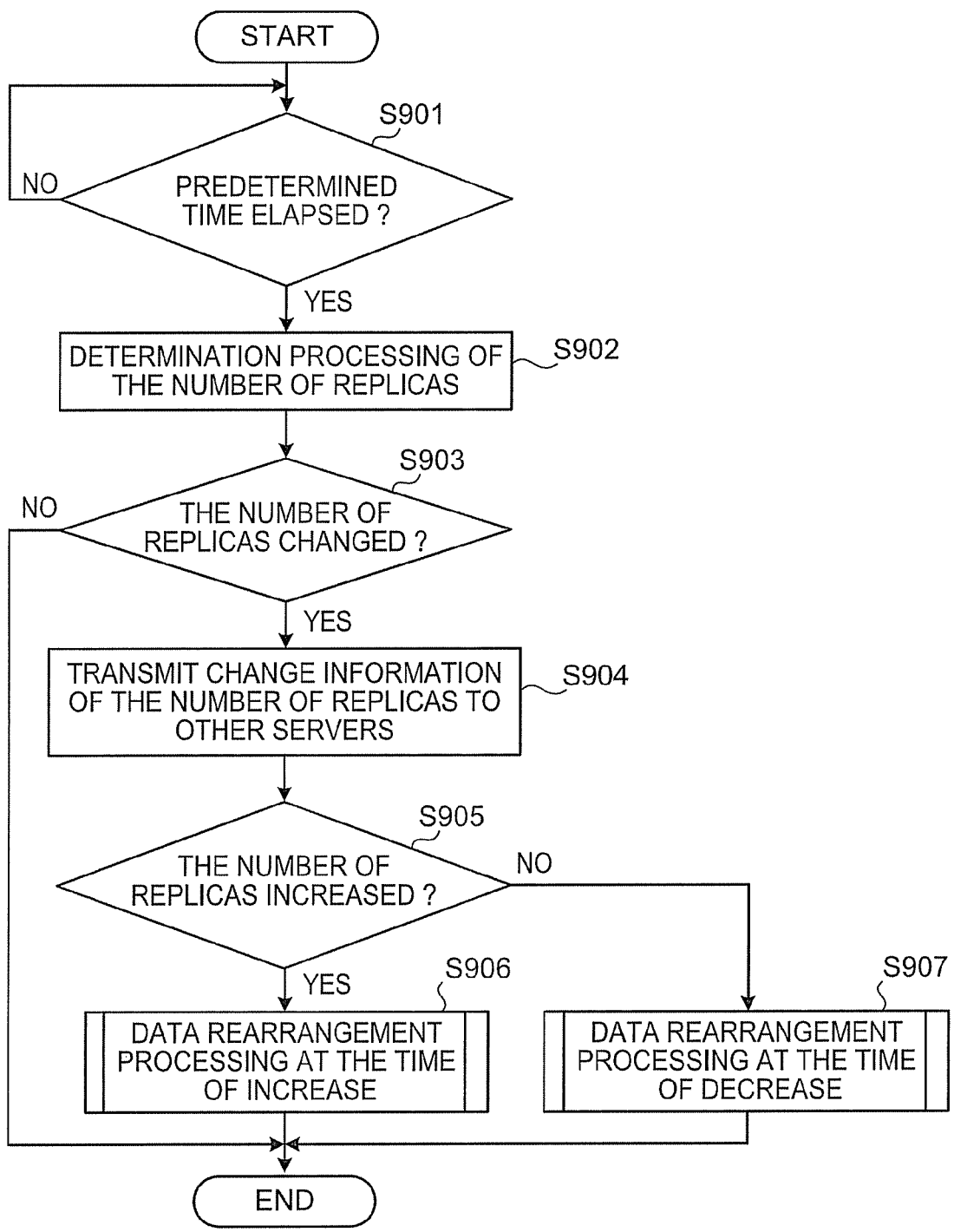
FIG. 9 is a flow chart showing data rearrangement processing at the time when the number of replicas is changed.

FIG. 9 is a flow chart showing the data rearrangement processing when the number of replicas is changed. In the flow chart shown in FIG. 9, the link processing section 102 first decides whether or not a predetermined time has elapsed (operation S901). Here, the link processing section 102 waits until the predetermined time elapses (operation S901: loop of No). When the predetermined time elapsed (operation S901: Yes), the link processing section 102 performs the processing to determine the number of replicas (operation S902).

Note that in operation S901, the link processing section 102 performs processing to decide the update timing of the number of replicas on the basis of time. As already described, the update timing can be arbitrarily and freely set. Therefore, the link processing section 102 may set the update timing on the basis of the number of processing, for example, on the basis of such decision of whether or not a predetermined number of times of processing requests are assigned to a specific data or its own server apparatus.

Further, in the processing to determine the number of replicas in operation S902, the link processing section 102 may use various access pattern analysis tools or receive a setting from the manager. Further, the link processing section 102 may autonomously determine the number of replicas by a procedure as will be described below.

When determining the number of replicas, the link processing section 102 next decides whether or not the number of replicas is changed by the determination in operation S902

(operation S903). Here, when the number of replicas is not changed (operation S903: No), the number of the arrangement servers is not changed, and hence the link processing section 102 ends a series of processing without performing any further processing.

On the other hand, when the number of replicas is changed (operation S903: Yes), the link processing section 102 transmits the information on the changed number of replicas to another server apparatus 100 (operation S904). Further, the link processing section 102 decides whether or not the number of replicas is increased by the change (operation S905). When the number of replicas is increased (operation S905: Yes), the link processing section 102 performs the data rearrangement processing at the time of increase in the number of replicas (operation S906). When the number of replicas is not increased (operation S905: No), that is, when the number of replicas is decreased, the link processing section 102 performs the data rearrangement processing at the time of decrease in the number of replicas (operation S907). After performing such processing, the link processing section 102 ends a series of processing.

(Processing at the Time of Increase in the Number of Replicas)

Figure 10:
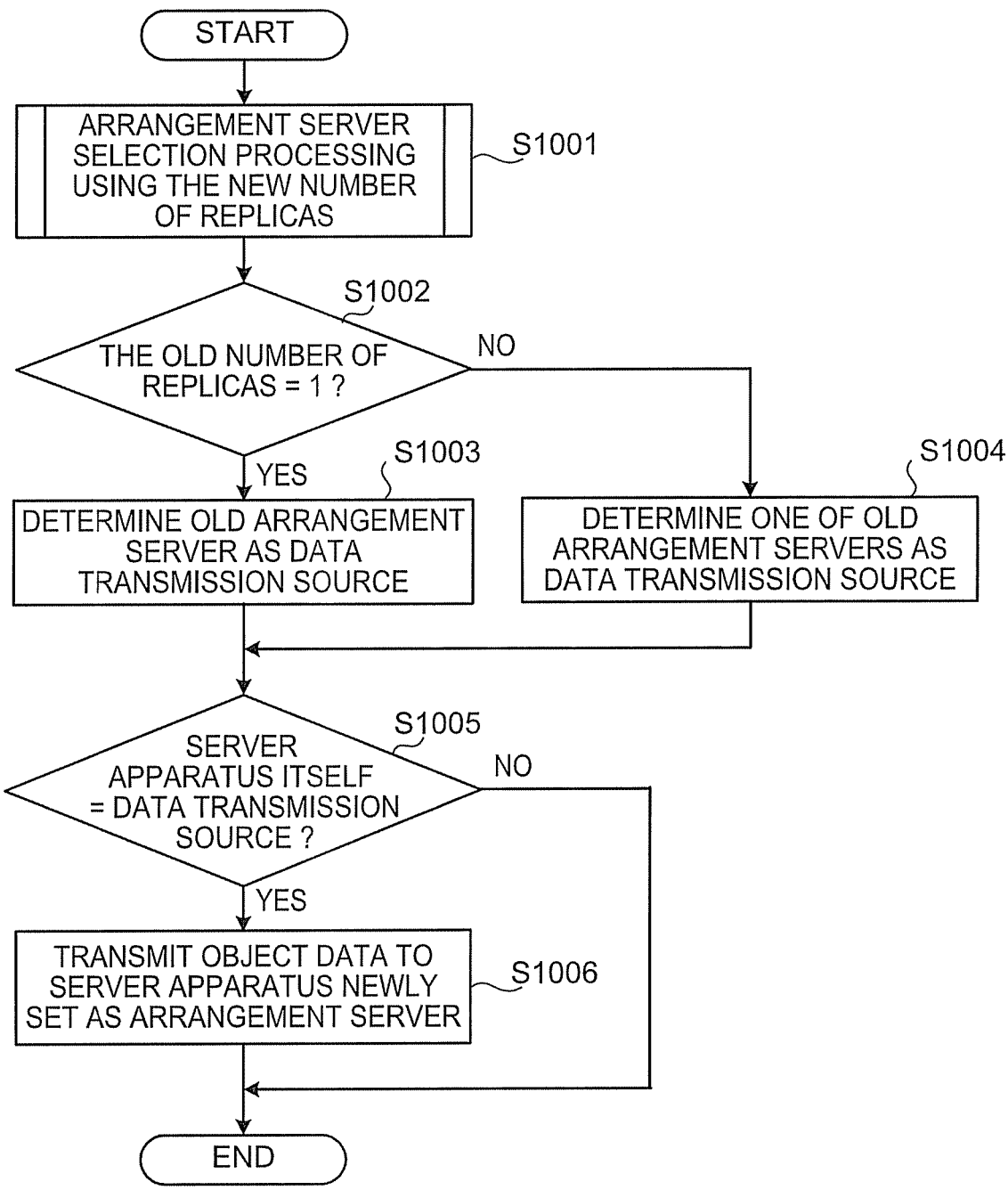
FIG. 10 is a flow chart showing data rearrangement processing at the time when the number of replicas is increased.

First, there will be described the processing when the number of replicas is increased. FIG. 10 is a flow chart showing the data rearrangement processing when the number of replicas is increased. In the flow chart shown in FIG. 10, the link processing section 102 first performs the arrangement server selection processing by using the newly changed number of replicas (operation S1001). The arrangement server selection processing performed in operation S1001 is the arrangement server selection processing described with reference to FIG. 5. It is assumed that the arrangement servers selected in operation S1001 are set as the new arrangement servers.

Next, the link processing section 102 decides whether or not the old number of replicas which is set for the object data is equal to 1 (operation S1002). Here, when deciding that the old number of replicas=1 (operation S1002: Yes), since the old arrangement server determined on the basis of the old number of replicas is surely determined as the new arrangement server, the link processing section 102 determines this arrangement server as the data transmission source server (operation S1003). The data transmission source server means the server apparatus 100 that transmits the object data to the server apparatus 100 newly added as the arrangement server, and in which the master data is arranged.

On the other hand, when deciding that the old number of replicas is not equal to 1 (operation S1002: No), the link processing section 102 determines, as the data transmission source, one of the old arrangement servers determined as the arrangement servers on the basis of the old number of replicas (operation S1004). Also here, when the number of replicas is increased, since the arrangement servers determined on the basis of the old number of replicas are surely included in the arrangement servers determined on the basis of the new number of replicas, the link processing section 102 may only determine one of the old arrangement servers as the data transmission source.

Then, the link processing section 102 decides whether or not its own server apparatus is the data transmission source (operation S1005). When determining its own server apparatus as the data transmission source (operation S1005: Yes), the link processing section 102 transmits the object data to the server apparatus 100 that is newly determined as the arrangement server (operation S1006), so as to thereby end a series of processing. On the other hand, when determining that its own server apparatus is not the data transmission source (operation S1005: No), the link processing section 102 ends a series of processing without performing any further processing. In this case, its own server apparatus needs not perform any further processing because the server apparatus 100 determined as the data transmission source performs the data arrangement.

(Processing at the Time of Decrease in the Number of Replicas)

Figure 11:
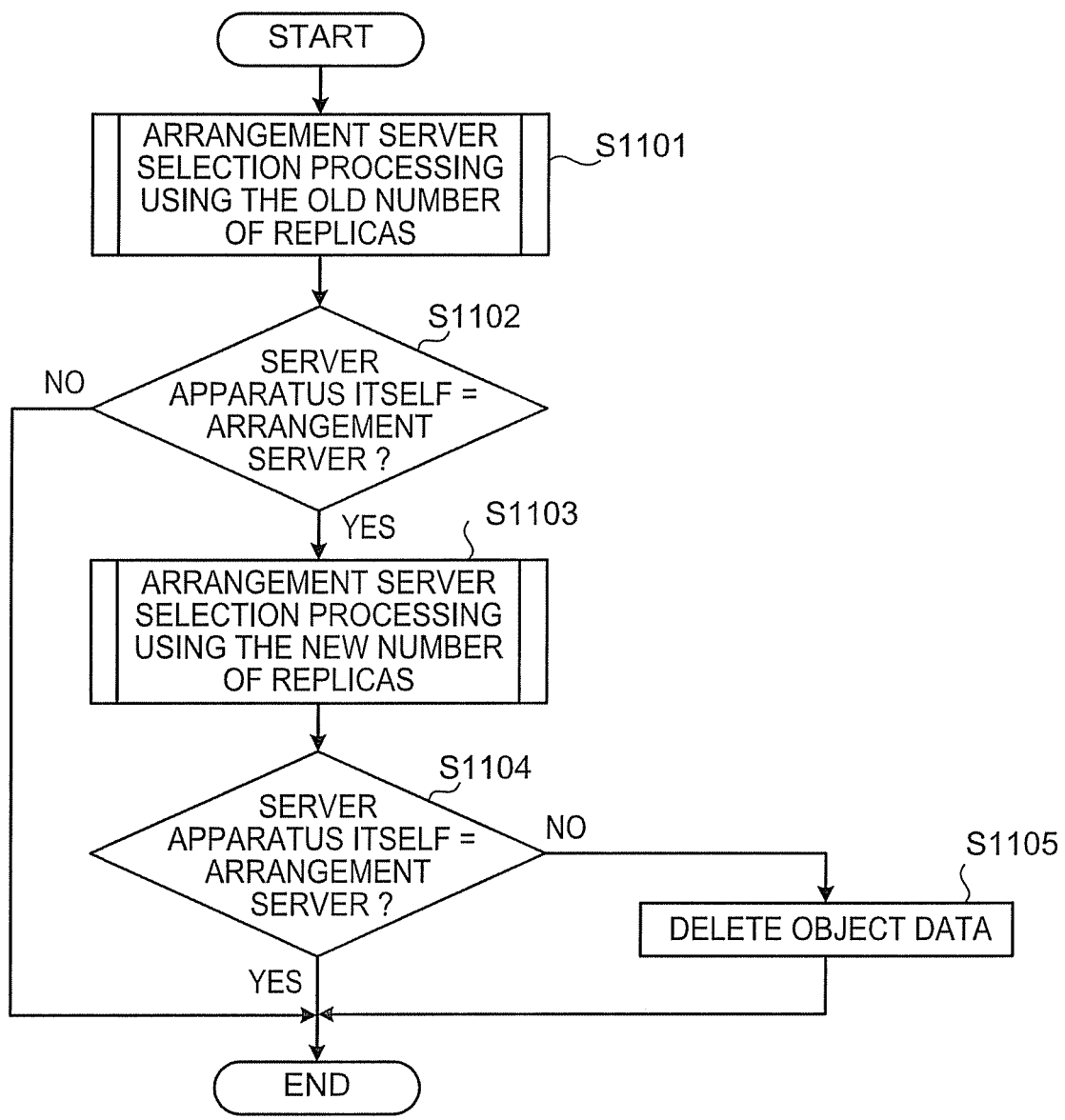
FIG. 11 is a flow chart showing data rearrangement processing at the time when the number of replicas is reduced.

Next, there will be described the processing at the time when the number of replicas is decreased. FIG. 11 is a flow chart showing the data rearrangement processing at the time when the number of replicas is decreased. In the flow chart shown in FIG. 11, the link processing section 102 first performs the arrangement server selection processing by using the old number of replicas (operation S1101). The arrangement server selection processing performed in operation S1101 is the arrangement server selection processing described with reference to FIG. 5.

With reference to the arrangement server selection processing in operation S1101, the link processing section 102 decides whether or not its own server apparatus is the arrangement server based on the old number of replicas (operation S1102). Here, when deciding that its own server apparatus is not the arrangement server (operation S1102: No), the object data, the number of replica of which is changed at this time, is not arranged in its own server apparatus, and hence the link processing section 102 ends a series of processing without performing any further processing.

On the other hand, when deciding in operation S1102 that its own server apparatus is the arrangement server (operation S1102: Yes), the link processing section 102 performs at this time the arrangement server selection process by using the new number of replicas (operation S1103). Then, with reference to the arrangement server selection processing in operation S1103, the link processing section 102 decides whether or not its own server apparatus is the arrangement server based on the new number of replicas (operation S1104).

When deciding in operation S1104 that its own server apparatus is the arrangement server based on the new number replicas (operation S1104: Yes), the link processing section 102 ends a series of processing without performing any further processing because the object data arranged in its own server apparatus is held. On the other hand, when deciding that its own server apparatus is not the arrangement server based on the new number replicas (operation S1104: no), the link processing section 102 erases the object data arranged in its own server apparatus (operation S1105), so as to end a series of processing without performing any further processing.

In this way, the server apparatus 100 according to the present embodiment is capable of efficiently arranging the object data in correspondence with a dynamic change in the number of replicas.

(Determination Processing of the Number of Replicas)

Next, there will be described the determination processing of the number of replicas. As described above, the setting method of the number of replicas in the server apparatus 100 according to the present embodiment is not uniform. For example, there may be used a method in which the access pattern is analyzed by the manager of the data distribution system 200 and in which the number of replicas for each data is set on the basis of the analysis result, or a method in which a tool for analyzing the access pattern is prepared and in which the number of replicas is set on the basis of the analysis result obtained by using the tool.

However, it is possible to reduce the burden of the manager by providing to the server apparatus 100 a function to autonomously determine the number of replicas. Therefore, here, there will be described a specific example at the time when the number of replicas is automatically determined by the link processing section 102 of each of the server apparatuses 100.

The link processing section 102 of the server apparatus 100 calculates the performance in the data access processing of each data in consideration of the ratio of reference and update of a certain data (contents of access to the data). The information used in the calculation processing includes the number of replicas, the write time to the storage section 103 or the read time from the storage section 103, and the communication time between the server apparatuses 100. In the environment in which the ratio of reference and update requests is changed, the link processing section 102 is required to periodically calculate the performance by using the ratio of the reference and update requests at each period, and to determine the number of replicas so as to maximize the performance. In the following, there will be described a procedure to determine the number of replicas by using the above described information.

First, there are listed variables used in the following description.

Update ratio: W [%]
Reference ratio: R [%]
The number of servers: N [integer]
The number of replicas: r (integer r>0)
Communication time between server apparatuses: Tt [sec]
Write time: Tw [sec]
Read time: Tr [sec]
Average latency at the time of update: Lw
Average latency at the time of reference: Lr First, the link processing section 102 counts the reference and update requests made to each of data at a certain fixed time interval, and obtains the reference ratio R and the update ratio W for each of the data. Specifically, in the case in which during one hour, the reference processing is performed 180 times and the update processing is performed 20 times, the reference ratio is obtained as R=90 [%] and the update ratio is obtained as W=10 [%]. Note that here, the reference ratio R and the update ratio W are obtained, as examples, from the numbers of the reference and update requests generated at the fixed time interval, respectively. However, the reference ratio R and the update ratio W may also be obtained on the basis of each of the numbers of the reference and update requests included in a certain number of generated requests. For example, in the case where among the total 100 times of requests, the number of times of the reference request is 90 and the number of times of the reference update is 10, the ratios are respectively obtained as R=90 [%] and W=10 [%].

Next, simultaneously with the calculation of the reference ratio R and the update ratio W, as described above, the link processing section 102 calculates the average latency of each of the data reference and the data update in correspondence with the number of replicas r, and determines the number of replicas so as to minimize the average latency. In the following, a procedure to determine the number of replicas will be described in detail with reference to FIGS. 12 and 13.

Note that the communication time Tt between the server apparatuses 100, the write time Tw, and the read time Tr may be respectively obtained by averaging a certain number of actually measured values. Alternatively, the values of the communication time Tt between the server apparatuses 100, the write time Tw, and the read time Tr may also be individually measured. When these values are known beforehand in such cases where the values are given beforehand as a specification, or where the values are disclosed as test values, these known values may also be used. Here, the means for obtaining these values is not limited in particular, and the manager of the data distribution system 200 can suitably select the means. Further, it is assumed that when the update request is transmitted from one server apparatus to a plurality of the other server apparatuses, the transmission and the actual update request are successively performed.

(Average Latency at the Time of Data Update)

Figure 12:
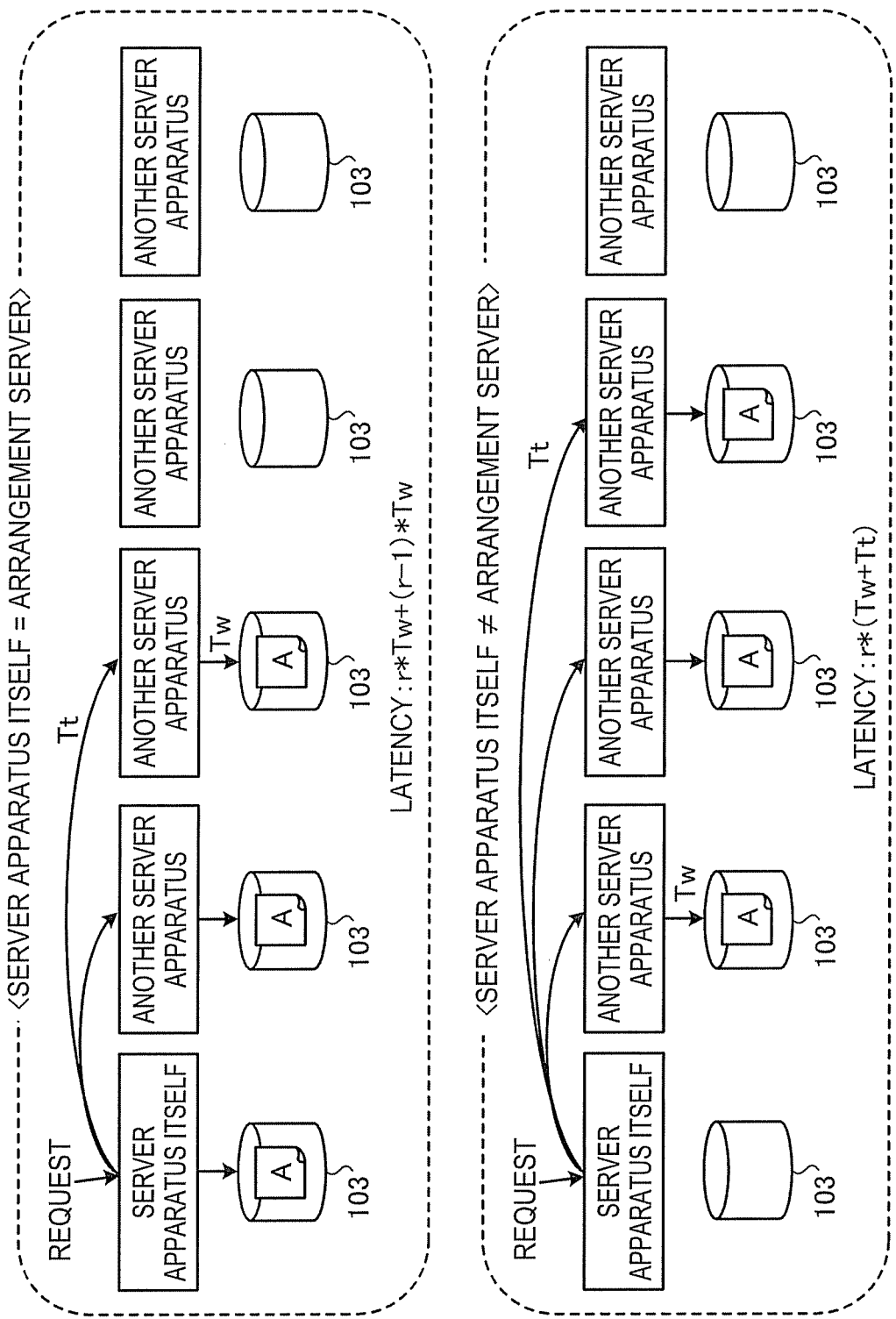
FIG. 12 is an illustration showing a latency calculation procedure at the time of data update.

First, there will be described the average latency at the time of data update. FIG. 12 is an illustration showing the latency calculation procedure at the time of data update. As shown in FIG. 12, the link processing section 102 is required to calculate the average latency at the time of data update in consideration of the latency in each of the cases in which its own server apparatus is determined as the arrangement server, and in which its own server apparatus is not the arrangement server.

First, when the server apparatus 100 that has received the update request is the arrangement server of the object data (the server apparatus itself=the arrangement server), the transmission destination of the data update request is the (r−1) remote server apparatuses 100 other than the server apparatus itself, and hence the update processing is actually performed in the n server apparatuses 100 including the server apparatus itself. Thus, the latency Lwa in this case can be obtained by following formula (1).

$$Lwa = r*Tw + (r-1)*Tt \qquad (1)$$

On the other hand, when the server apparatus 100 that has received the update request is not the arrangement server of the object data (the server apparatus itself≠the arrangement server), the transmission destination of the data update request is the r remote server apparatuses 100 other than the server apparatus itself, and hence the actual update processing is also performed in the r server apparatuses. Therefore, the latency Lwb in this case can be obtained by following formula (2).

$$Lwb = r*(Tw + Tt) \qquad (2)$$

Further, the probability that the server apparatus 100 that has received the update request is the arrangement server of the object data is given by r/N, while the probability that the server apparatus 100 that has received the update request is not the arrangement server of the object data is given by (N−r)/N. Thus, the average latency Lw at the time of update is obtained by following formula (3).

$$\begin{aligned} Lw &= Lwa*r/N + Lwb*(N-r)/N \\ &= \{r*Tw + (r-1)*Tt\}* \\ & \quad r/N + r*(Tt+Tw)*(N-r)/N \end{aligned} \qquad (3)$$

(Average Latency at the Time of Data Reference)

Figure 13:
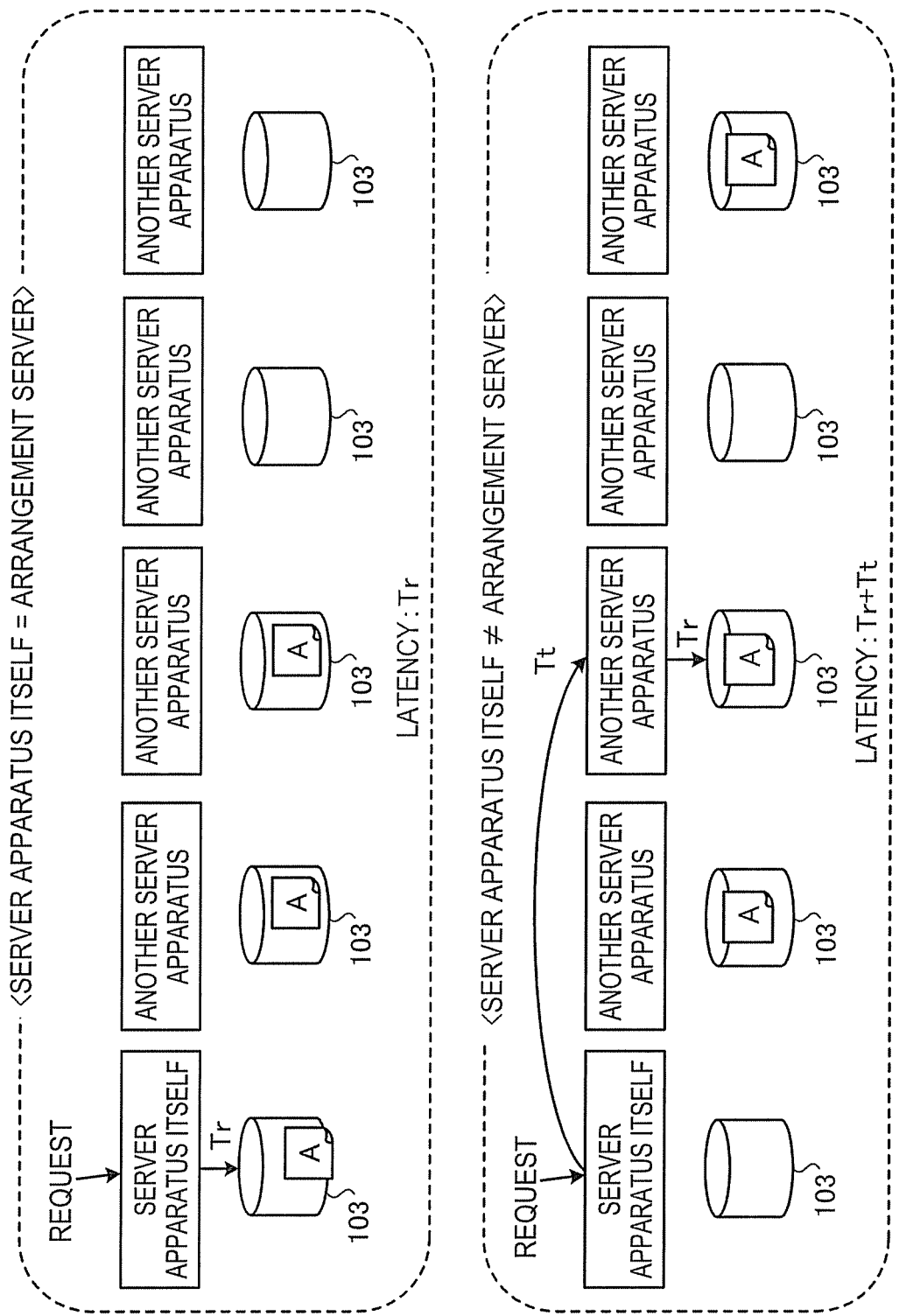
FIG. 13 is an illustration showing a latency calculation procedure at the time of data reference.

Next, there will be described the average latency at the time of data reference. FIG. 13 is an illustration showing a procedure to calculate the latency at the time of data reference. As shown in FIG. 13, the link processing section 102 is also required to calculate the average latency at the time of data reference in consideration of the latency in each of the cases in which its own server apparatus is determined as the arrangement server, and in which its own server apparatus is not the arrangement server.

First, in the case in which the server apparatus that has received the reference request is the arrangement server of the object data (the server apparatus itself=the arrangement server), the latency is only the reference processing time in the server apparatus itself because the received data reference processing needs not to be transmitted to another server apparatus 100. Therefore, the latency Lra in this case is obtained by the following formula (4).

$$Lra = Tr \quad (4)$$

On the other hand, in the case in which the server apparatus that has received the reference request is not the arrangement server of the object data (the server apparatus itself≠the arrangement server), the link processing section 102 of the server apparatus transmits the data reference processing to one of the server apparatuses 100 set as the arrangement servers, so that the reference process is performed in the transmission destination server apparatus 100. Therefore, the latency Lrb in this case is obtained by the following formula (5).

$$Lrb = Tr + Tt \quad (5)$$

Also in the case of reference processing, the probability that the server apparatus 100 that has received the reference request is the arrangement server of the object data is given by r/N, while the probability that the server apparatus 100 that has received the reference request is not the arrangement server of the object data is given by (N−r)/N. Thus, the average latency Lr at the time of reference is obtained by the following formula (6).

$$\begin{aligned}Lr &= Lwa * r/N + Lwb*(N-r)/N \\ &= Tr*r/N + (Tt+Tr)*(N-r)/N\end{aligned} \quad (6)$$

As described above, the data reference ratio R and the data update ratio W are obtained by performing the above described monitoring for a fixed time. Thus, by using the ratios, the average latency L in the case in which the number of replicas is r, can be obtained by the following formula (7).

$$\begin{aligned}L &= Lw*W/100 + Lr*R/100 \\ &= \{\{r*Tw + (r-1)*Tt\}*r/N + r*(Tt+Tw)*(N-r)/N\} * \\ &\quad W/100 + \{Tr*r/N + (Tt+Tr)*(N-r)/N\}*R/100\end{aligned} \quad (7)$$

The above described formula used to obtain the average latency L is a linear expression of the number of replicas r. Thus, the average latency L is minimized in one of the cases in which the number of replicas r=1, and in which the number of replicas r=the number of server apparatuses N. Therefore, the link processing section 102 calculates only the average latency L1 at the time when r=1, and the average latency LN at the time when r=N, so as to set, as the new number of replicas, the number of replicas that minimizes the average latency. That is, all the average latencies are not calculated for all of r ranging from 1 to N, and the number of replicas can be uniquely determined by only calculating the average latencies in the cases where r=1 and where r=N.

When L1<LN, the number of replicas is set to 1.
When L1>LN, the number of replicas is set to N.

Note that when it is set during actual operation of the data distribution system 200 that the number of replicas=1, the setting may not be desirable from a viewpoint of availability. Therefore, there may also be used a method in which, when it is determined that the number of replicas is set to 1; the number of replicas is set to a minimum number of replicas that is set beforehand by the manager of the data distribution system 200.

As described above, according to the present embodiment, by monitoring not only the data reference frequency but also the data update frequency, it is also possible to detect the case where the processing efficiency is on the contrary lowered by the increase in the number of replicas. In such case, the lowering of the update processing efficiency can be prevented by erasing unnecessary replicas. Further, according to the present embodiment, the optimum number of replicas can be individually set for each data without being influenced by the number of replicas of another data, so that the data can be efficiently arranged.

Note that the data processing method described as the present embodiment can be realized in such a manner that a program prepared beforehand is executed by a computer, such as a personal computer and a workstation. The program is recorded in a computer-readable recording medium, such as a hard disk, a flexible disk, a CD-ROM, an MO and a DVD, and is executed by being read from the recording medium by the computer. Further, the program may be a medium that can be distributed via a network, such as the Internet.

Further, the server apparatus 100 described as the present embodiment can also be realized by an application specific integrated circuit (hereinafter simply referred to as "ASIC"), such as a standard cell and a structured ASIC, and a programmable logic device (PLD) such as an FPGA. Specifically, for example, the server apparatus 100 can be manufactured in such a manner that the above described functions (the acquisition section 301 to the determination section 307) of the link processing section 102 of the server apparatus 100 is defined by HDL descriptions, and that the HDL descriptions are logically synthesized, so as to be written in the ASIC and PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable recording medium storing a data processing program that causes a computer of a group of computers, which are configured to communicate with each other, to execute:

a setting procedure configured, when a new write processing request for an arbitrary object data is inputted as a processing request, to set a preset value as a first number indicating a number of replicas of the arbitrary object data;

an acquisition procedure configured, when a processing request for the arbitrary object data is inputted, to acquire the first number that has been set for the arbitrary object data;

a selection procedure configured to select one or more computers that serve as arrangement destinations of the arbitrary object data and are as many as the first number, from the group of computers by using a predetermined algorithm that is performed based on the first number;

a number transmission procedure configured to transmit the first number to all the group of computers; and a processing request transmission procedure configured to transmit the processing request to each of the one or more computers that are selected by the selection procedure and as many as the first number.

2. The non-transitory computer-readable recording medium according to claim 1, the program further causing the computer to execute:
a decision procedure to decide whether the first number is equal to a second number indicating the total number of the group of computers when the first number is set by the setting procedure,
wherein when the decision procedure decides that the first number is equal to the second number, the processing request transmission procedure transmits the new write processing request of the arbitrary object data to all the group of computers.

3. The non-transitory computer-readable recording medium according to claim 2,
wherein the decision procedure decides whether the first number is equal to the second number when a write processing request for the arbitrary object data arranged in any one of the group of computers is inputted as the processing request for the arbitrary object data,
wherein when the decision procedure decides that the first number is not equal to the second number, the selection procedure selects computers, in which the arbitrary object data is arranged and which are as many as the first number, from the group of computers by using the predetermined algorithm, and
wherein the processing request transmission procedure transmits the write processing request for the arbitrary object data to each of the one or more computers that are selected by the selection procedure and as many as the first number.

4. The non-transitory computer-readable recording medium according to claim 1, wherein when a reference processing request for the arbitrary object data arranged in any one of the group of computers is inputted as the processing request for the arbitrary object data, the processing request transmission procedure transmits the reference processing request for the arbitrary object data to the one or more computers that are selected by the selection procedure and as many as the first number.

5. The non-transitory computer-readable recording medium according to claim 2, wherein when a reference processing request for the arbitrary object data arranged in any one of the group of computers is inputted as the processing request for the arbitrary object data, the processing request transmission procedure transmits the reference processing request for the arbitrary object data to the one or more computers that are selected by the selection procedure and as many as the first number.

6. The non-transitory computer-readable recording medium according to claim 3, wherein when a reference processing request for the arbitrary object data arranged in any one of the group of computers is inputted as the processing request for the arbitrary object data, the processing request transmission procedure transmits the reference processing request for the arbitrary object data to the one or more computers that are selected by the selection procedure and as many as the first number.

7. The non-transitory computer-readable recording medium according to claim 1, the program further causing the computer to execute:
an execution procedure to execute processing corresponding to the processing request when the processing request is inputted by the computer or received from another computer.

8. The non-transitory computer-readable recording medium according to claim 2, the program further causing the computer to execute:
an execution procedure to execute processing corresponding to the processing request when the processing request is inputted by the computer or received from another computer.

9. The non-transitory computer-readable recording medium according to claim 3, the program further causing the computer to execute:
an execution procedure to execute processing corresponding to the processing request when the processing request is inputted by the computer or received from another computer.

10. The non-transitory computer-readable recording medium according to claim 7, wherein, when a reference processing request for the arbitrary object data is received as the processing request, the execution procedure returns the result of the reference processing that was executed for the arbitrary object data according to the processing request, to a source computer that is a transmission source of the processing request.

11. The non-transitory computer-readable recording medium according to claim 7, the program further causing the computer to execute:
a determination procedure to determine the first number for the arbitrary object data by referring to the processing request on which the processing has been executed by the execution procedure;
wherein the number transmission procedure, when a number different from the currently set number of replicas is determined as the first number by the determination procedure, transmits the determined first number to all the group of computers,
wherein the selection procedure, upon receiving the determined first number transmitted by the number transmission procedure, selects the one or more computers, in which the arbitrary object data is arranged and which are as many as the first number, from the group of computers, according to the predetermined algorithm that is performed based on the first number, and
wherein the execution procedure, when the computer is selected by the selection procedure as the computer in which the arbitrary object data is newly arranged, writes the arbitrary object data to the computer, while when the computer is no longer selected by the selection procedure as the computer in which the arbitrary object data is newly arranged, the execution procedure erases the data.

12. The non-transitory computer-readable recording medium according to claim 10, the program further causing the computer to execute:
a determination procedure to determine the first number for the arbitrary object data by referring to the processing request on which the processing has been executed by the execution procedure;
wherein the number transmission procedure, when the currently set number of replicas is determined as the first number by the determination procedure, transmits the determined first number all the group of computers,
wherein the selection procedure, upon receiving the determined first number transmitted by the number transmission procedure, selects the one or more computers, in which the arbitrary object data is arranged and which are as many as the first number, from the group of computers, according to the predetermined algorithm that is performed based on the first number, and
wherein the execution procedure, when the computer is selected by the selection procedure as the computer in which the arbitrary object data is newly arranged, writes the arbitrary object data to the computer, while when the computer is no longer selected by the selection procedure as the computer in which the arbitrary object data is newly arranged, the execution procedure erases the data.

13. The non-transitory computer-readable recording medium according to claim 11, wherein the determination procedure determines the second number as the first number for the arbitrary object data, in the case in which an average value of the processing time for the arbitrary object data, when the first number is set at a value of the second number, is equal to or greater than a predetermined value.

14. The non-transitory computer-readable recording medium according to claim 12, wherein the determination procedure determines the second number as the first number for the arbitrary object data, in the case in which an average value of the processing time for the arbitrary object data, when the first number is set at a value of the second number, is equal to or greater than a predetermined value.

15. The non-transitory computer-readable recording medium according to claim 11, wherein the determination procedure determines a settable minimum value as the first number for the arbitrary object data, in the case in which when the first number for the arbitrary object data is set at a value of 1, an average value of the processing time for the arbitrary object data is less than a predetermined value.

16. A server apparatus that is a computer and constitutes a server apparatus group configured to communicate with each other, the server apparatus comprising:
   an acquisition unit configured, when a processing request for an arbitrary data is inputted, to acquire a number of replicas set in the arbitrary data;
   a selection unit configured to select server apparatuses, which serve as arrangement destinations of the arbitrary data and are as many as the number of replicas, from the server apparatuses of the server apparatus group by using a predetermined algorithm;
   a transmission unit of the number of replicas, configured to transmit the number of replicas of the arbitrary data, wherein the number is acquired by the acquisition unit, to all the server apparatuses of the server apparatus group;
   a processing request transmission unit configured to transmit the processing request to each of the server apparatuses that are selected by the selection unit and as many as the number of replicas;
   an execution unit configured, when the processing request transmitted from the server apparatus itself or another server apparatus is received, to execute processing corresponding to the processing request; and
   a determination unit configured to determine at each arbitrary time the number of replicas of the arbitrary data by referring to the processing request for the arbitrary data, which processing request is executed by the execution unit,
   wherein, when the number of replicas different from the currently set number of replicas is determined by the determination unit, the transmission unit of the number of replicas transmits the determined number of replicas to all the server apparatuses of the server apparatus group,
   wherein, when the determined number of replicas is transmitted by the transmission unit of the number of replicas, the selection unit newly selects the server apparatuses, in which the arbitrary data is arranged and which are as many as the determined number of replicas, from the server apparatuses of the server apparatus group according to a predetermined algorithm,
   wherein, when the server apparatus itself is selected by the selection unit as the server apparatus with the arbitrary data to be newly arranged therein, the execution unit performs the writing of the arbitrary data, and
   wherein, when the server apparatus itself is no longer selected by the selection unit as the server apparatus with the arbitrary data to be newly arranged therein, the execution unit erases the data.

17. A data processing method of a computer that constitutes a group of computers communicable with each other, wherein the data processing method is configured to execute:
   an acquisition procedure configured, when a processing request for an arbitrary data is inputted, to acquire a number of replicas set in the arbitrary data;
   a selection procedure configured to select computers, which serve as arrangement destinations of the arbitrary data and are as many as the number of replicas, from the computers of the computer group by using a predetermined algorithm;
   a transmission procedure of the number of replicas, configured to transmit the number of replicas of the arbitrary data, wherein the number is acquired by the acquisition procedure, to all the computers of the computer group;
   a processing request transmission procedure configured to transmit the processing request to each of the computers which are selected by the selection procedure and as many as the number of replicas;
   an execution procedure configured, when the processing request transmitted from the computer itself or another computer is received, to execute processing corresponding to the processing request; and
   a determination procedure configured to determine at each arbitrary time the number of replicas of the arbitrary data by referring to the processing request for the arbitrary data, which processing request is executed by the execution procedure,
   wherein, when the number of replicas different from the currently set number of replicas is determined by the determination procedure, the transmission procedure of the number of replicas transmits the determined number of replicas to all the computers of the computer group,
   wherein, when the determined number of replicas is transmitted by the transmission procedure of the number of replicas, the selection procedure newly selects computers, in which the arbitrary data is to be arranged and which are as many as the determined number of replicas, from the computers of the computer group according to a predetermined algorithm,
   wherein, when the computer itself is selected by the selection procedure as the computer with the arbitrary data to be newly arranged therein, the execution procedure performs the writing of the arbitrary data, and
   wherein, when the computer itself is no longer selected by the selection procedure as the computer with the arbitrary data to be newly arranged therein, the execution procedure erases the data.

18. A server apparatus that is a computer and constitutes a server apparatus group configured to communicate with each other, the server apparatus comprising:
   an acquisition unit configured, when a processing request for an arbitrary object data is inputted, to acquire a first number that indicates the number of replicas and is set in the arbitrary object data;
   a selection unit configured to select one or more server apparatuses that serve as arrangement destinations of the arbitrary object data and are as many as the first number, from the server apparatus group by using a predetermined algorithm that is performed based on the first number;

a number transmission unit configured to transmit the acquired first number for the arbitrary object data to all the selected one or more server apparatuses of the server apparatus group;

a processing request transmission unit configured to transmit the processing request to each of the one or more server apparatuses that are selected by the selection unit and as many as the first number;

an execution unit configured, upon receiving the processing request that is inputted by the server apparatus or transmitted from another server apparatus, to execute processing corresponding to the processing request; and a determination unit configured to determine at each arbitrary time the first number for the arbitrary object data by referring to the processing request on which the processing was executed by the execution unit for the arbitrary object data, wherein, when a number different from the currently set number of replicas is determined as the first number by the determination unit, the number transmission transmits the determined first number to all the server apparatuses of the server apparatus group, wherein the selection unit, upon receiving the determined first number transmitted by the number transmission unit, newly selects the one or more server apparatuses, in which the arbitrary object data is arranged and which are as many as the determined first number, from the server apparatus group, according to the predetermined algorithm that is performed based on the first number, wherein, when the server apparatus is selected by the selection unit as the server apparatus in which the arbitrary object data is newly arranged, the execution unit performs writing of the arbitrary object data, and wherein, when the server apparatus is no longer selected by the selection unit as the server apparatus in which the arbitrary object data is newly arranged, the execution unit erases the arbitrary object data.

19. A data processing method of a computer that constitutes a group of computers that are configured to communicate with each other, the data processing method executing:

an acquisition procedure configured, when a processing request for an arbitrary object data is inputted, to acquire a first number that indicates the number of replicas and is set in the arbitrary object data;

a selection procedure configured to select one or more computers that serve as arrangement destinations of the arbitrary object data and are as many as the first number, from the group of computers by using a predetermined algorithm that is performed based on the first number;

a number transmission procedure, configured to transmit the first number of the arbitrary object data to all the one or more computers;

a processing request transmission procedure configured to transmit the processing request to each of the one or more computers which are selected by the selection procedure and as many as the first number;

an execution procedure configured, when the processing request transmitted from the computer or another computer is received, to execute processing corresponding to the processing request; and a determination procedure configured to determine at each arbitrary time the first number for the arbitrary object data by referring to the processing request on which the processing has been executed by the execution unit for the arbitrary object data, wherein, when a number different from the currently set number of replicas is determined as the first number by the determination procedure, the number transmission procedure transmits the determined first number to all the computers of the group of computers, wherein, upon receiving the determined first number transmitted by the number transmission procedure, the selection procedure newly selects the one or more computers, in which the arbitrary object data is arranged and which are as many as the determined first number, from the group of computers according to a predetermined algorithm that is performed based on the first number, wherein, when the computer is selected by the selection procedure as the computer in which the arbitrary object data is newly arranged, the execution procedure performs writing of the arbitrary object data, and wherein, when the computer is no longer selected by the selection procedure as the computer in which the arbitrary object data is newly arranged, the execution procedure erases the arbitrary object data.

\* \* \* \* \*

UNITED STATES PATENT AND TRADEMARK OFFICE
CERTIFICATE OF CORRECTION

PATENT NO. : 8,577,838 B2  
APPLICATION NO. : 12/547805  
DATED : November 5, 2013  
INVENTOR(S) : Miho Murata Page 1 of 1

It is certified that error appears in the above-identified patent and that said Letters Patent is hereby corrected as shown below:

On the Title Page, Item (57) In Column 2 (Abstract), Line 15, delete "each" and insert -- each of --, therefor.

In the Claims

In Column 24, Line 56, In Claim 12, delete "all" and insert -- to all --, therefor.

Signed and Sealed this
Eleventh Day of February, 2014

Michelle K. Lee
*Deputy Director of the United States Patent and Trademark Office*